(12) United States Patent
Peng et al.

(10) Patent No.: US 10,887,071 B2
(45) Date of Patent: Jan. 5, 2021

(54) METHOD FOR DETERMINING FEEDBACK INFORMATION, TERMINAL DEVICE, AND NETWORK DEVICE

(71) Applicant: Huawei Technologies Co., Ltd., Shenzhen (CN)

(72) Inventors: Jinlin Peng, Shanghai (CN); Fan Wang, Berkshire (GB); Hao Tang, Shanghai (CN); Yi Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/787,858

(22) Filed: Feb. 11, 2020

(65) Prior Publication Data

US 2020/0177352 A1    Jun. 4, 2020

Related U.S. Application Data

(63) Continuation of application No. PCT/CN2018/100070, filed on Aug. 10, 2018.

(30) Foreign Application Priority Data

Aug. 11, 2017  (CN) .......................... 2017 1 0686826

(51) Int. Cl.
    *H04L 5/00*    (2006.01)
    *H04L 1/18*    (2006.01)
    *H04W 72/04*   (2009.01)

(52) U.S. Cl.
    CPC .......... *H04L 5/0055* (2013.01); *H04L 1/1812* (2013.01); *H04W 72/0413* (2013.01)

(58) Field of Classification Search
    CPC . H04L 1/1812; H04L 5/0055; H04W 72/0413
    See application file for complete search history.

(56) References Cited

U.S. PATENT DOCUMENTS 9,301,183 B2    3/2016  Heo et al.
2015/0043394 A1  2/2015  Lin et al.
(Continued)

FOREIGN PATENT DOCUMENTS

CN    103326806 A    9/2013
CN    104284429 A    1/2015
(Continued)

OTHER PUBLICATIONS

Li et al., "Control Channel Design for Carrier Aggregation between LTE FDD and LTE TDD Systems," 2012 IEEE 75th Vehicular Technology Conference (VTC Spring), pp. 1-5, Institute of Electrical and Electronics Engineers, New York, New York (May 2012).
(Continued)

*Primary Examiner* — Walli Z Butt
*Assistant Examiner* — Ryan C Kavleski
(74) *Attorney, Agent, or Firm* — Leydig, Voit & Mayer, Ltd.

(57) ABSTRACT

Embodiments of this application provide a method for processing information bits in a wireless communication network. A communication device receives a radio resource control (RRC) signaling, wherein the RRC signaling comprises time window information and time unit format information, wherein the time window information comprises a hybrid automatic repeat request (HARQ) time sequence K1 set, wherein K1 is a time relationship between a time unit of a physical downlink shared channel (PDSCH) and a time unit of a physical uplink control channel (PUCCH), or wherein the K1 is a time relationship between a time unit of a (PDSCH) and a time unit of a physical uplink shared channel (PUSCH). The device determines HARQ feedback
(Continued)

information based on the time window information and the time unit format information and sends the HARQ feedback information.

20 Claims, 18 Drawing Sheets

(56) References Cited

U.S. PATENT DOCUMENTS

| | | | |
|---|---|---|---|
| 2016/0204906 A1* | 7/2016 | Cheng | H04L 1/1861 370/280 |
| 2016/0212734 A1 | 7/2016 | He et al. | |
| 2017/0195103 A1* | 7/2017 | Guan | H04L 5/0055 |
| 2018/0338301 A1 | 11/2018 | Gao et al. | |
| 2018/0367262 A1* | 12/2018 | Hwang | H04L 1/1854 |
| 2019/0068317 A1* | 2/2019 | Babaei | H04W 72/0446 |
| 2019/0268103 A1* | 8/2019 | Park | H04L 1/18 |

FOREIGN PATENT DOCUMENTS

| | | |
|---|---|---|
| CN | 106714320 A | 5/2017 |
| EP | 3076577 A1 | 10/2016 |
| WO | 2013138021 A1 | 9/2013 |
| WO | 2016161629 A1 | 10/2016 |
| WO | 2017084641 A1 | 5/2017 |

OTHER PUBLICATIONS

"3rd Generation Partnership Project; Technical Specification Group Radio Access Network; NR; Radio Resource Control (RRC); Protocol specification (Release 15)," 3GPP TS 38.331 V0.0.4, pp. 1-37, 3rd Generation Partnership Project, Valbonne, France (Jun. 2017).

Lingzhi Sun, "Research of MAC'S Scheduling and HARQ in LTE System," Master's Degree Thesis of Beijing Jiaotong University, pp. 1-72 (Apr. 2014) with English Abstract.

"Other issues on NR CA and DC including SRS switching and SUL," 3GPP TSG RAN WG1 Meeting #90bis, Prague, Czech Republic, R1-1717080, pp. 1-9, 3rd Generation Partnership Project, Valbonne, France (Oct. 9-13, 2017).

"3rd Generation Partnership Project; Technical Specification Group Radio Access Network; NR; Physical layer procedures for control (Release 15)," 3GPP TS 38.213 V0.0.1, pp. 1-14, 3rd Generation Partnership Project, Valbonne, France (Jul. 2017).

"HARQ feedback timing for NR," 3GPP TSG RAN WG1 NR Ad Hoc Meeting, Qingdao, China, R1-1709970, total 5 pages, 3rd Generation Partnership Project, Valbonne, France (Jun. 27-30, 2017).

* cited by examiner

| | |
|---|---|
| Decoding result for a TB in a time unit scheduled by D(4,1) | 0 |
| Default value | 1 |
| Default value | 2 |
| Default value | 3 |
| Decoding result for a TB in a time unit scheduled by D(4,2) | 4 |
| Default value | 5 |
| Default value | 6 |
| Default value | 7 |
| Decoding result for a TB in the 1$^{st}$ time unit scheduled by D(4,3) | 8 |
| Decoding result for a TB in the 2$^{nd}$ time unit scheduled by D(4,3) | 9 |
| Decoding result for a TB in the 3$^{rd}$ time unit scheduled by D(4,3) | 10 |
| Decoding result for a TB in the 4$^{th}$ time unit scheduled by D(4,3) | 11 |
| Decoding result for a TB in the 1$^{st}$ time unit scheduled by D(4,4) | 12 |
| Decoding result for a TB in the 2$^{nd}$ time unit scheduled by D(4,4) | 13 |
| Default value | 14 |
| Default value | 15 |
| Decoding result for a TB in a time unit scheduled by D(5,5) | 16 |
| Default value | 17 |
| Default value | 18 |
| Default value | 19 |
| Decoding result for a TB in the 1$^{st}$ time unit scheduled by D(6,6) | 22 |
| Decoding result for a TB in the 2$^{nd}$ time unit scheduled by D(6,6) | 21 |
| Default value | 22 |
| Default value | 23 |

FIG. 6a

| | |
|---|---|
| Decoding result for a TB in a time unit scheduled by D(4,1) | 0 |
| Default value | 1 |
| Default value | 2 |
| Default value | 3 |
| NACK | 4 |
| NACK | 5 |
| NACK | 6 |
| NACK | 7 |
| Decoding result for a TB in the 1st time unit scheduled by D(4,3) | 8 |
| Decoding result for a TB in the 2nd time unit scheduled by D(4,3) | 9 |
| Decoding result for a TB in the 3rd time unit scheduled by D(4,3) | 10 |
| Decoding result for a TB in the 4th time unit scheduled by D(4,3) | 11 |
| Decoding result in the 1st time unit scheduled by D(4,4) | 12 |
| Decoding result for a TB in the 2nd time unit scheduled by D(4,4) | 13 |
| Default value | 14 |
| Default value | 15 |
| Decoding result for a TB in a time unit scheduled by D(5,5) | 16 |
| Default value | 17 |
| Default value | 18 |
| Default value | 19 |
| Decoding result for a TB in the 1st time unit scheduled by D(6,6) | 22 |
| Decoding result for a TB in the 2nd time unit scheduled by D(6,6) | 21 |
| Default value | 22 |
| Default value | 23 |

FIG. 6b

| 0 | 1 | 2 | 3 | 4 | 5 |
|---|---|---|---|---|---|
| Decoding result for a TB in a time unit scheduled by D(4,1) | Decoding result for a TB in a time unit scheduled by D(4,2) | Result of an AND operation performed on decoding results for TBs in four time units scheduled by D(4,3) | Result of an AND operation performed on decoding results for TBs in two time units scheduled by D(4,4) | Decoding result for a TB in a time unit scheduled by D(5,5) | Result of an AND operation performed on decoding results for TBs in two time units scheduled by D(6,6) |

FIG. 7a

| 0 | 1 | 2 | 3 | 4 | 5 |
|---|---|---|---|---|---|
| Decoding result for a TB in a time unit scheduled by D(4,1) | NACK | Result of an AND operation performed on decoding results for TBs in four time units scheduled by D(4,3) | Result of an AND operation performed on decoding results for TBs in two time units scheduled by D(4,4) | Decoding result for a TB in a time unit scheduled by D(5,5) | Result of an AND operation performed on decoding results for TBs in two time units scheduled by D(6,6) |

FIG. 7b

| | |
|---|---|
| Decoding result for a TB in one time unit scheduled by D(8,1) | 0 |
| Decoding result for a TB in one time unit scheduled by D(8,2) | 1 |
| Decoding result for a TB in the 1st time unit scheduled by D(8,6) | 2 |
| Decoding result for a TB in the 2nd time unit scheduled by D(8,6) | 3 |
| Decoding result for a TB in the 3rd time unit scheduled by D(8,6) | 4 |
| Decoding result for a TB in the 4th time unit scheduled by D(8,6) | 5 |
| Decoding result for a TB in the 1st time unit scheduled by D(8,8) | 6 |
| Decoding result for a TB in the 2nd time unit scheduled by D(8,8) | 7 |
| Decoding result for a TB in one time unit scheduled by D(9,9) | 8 |
| Decoding result for a TB in the 1st time unit scheduled by D(11,11) | 9 |
| Decoding result for a TB in the 2nd time unit scheduled by D(11,11) | 10 |

FIG. 9a

| | |
|---|---|
| Decoding result for a TB in one time unit scheduled by D(8,1) | 0 |
| NACK | 1 |
| Decoding result for a TB in the 1st time unit scheduled by D(8,6) | 2 |
| Decoding result for a TB in the 2nd time unit scheduled by D(8,6) | 3 |
| Decoding result for a TB in the 3rd time unit scheduled by D(8,6) | 4 |
| Decoding result for a TB in the 4th time unit scheduled by D(8,6) | 5 |
| Decoding result for a TB in the 1st time unit scheduled by D(8,8) | 6 |
| Decoding result for a TB in the 2nd time unit scheduled by D(8,8) | 7 |
| Decoding result for a TB in one time unit scheduled by D(9,9) | 8 |
| Decoding result for a TB in the 1st time unit scheduled by D(11,11) | 9 |
| Decoding result for a TB in the 2nd time unit scheduled by D(11,11) | 10 |

FIG. 9b

| | |
|---|---|
| Decoding result for a TB in the 1st time unit scheduled by CC1 BWP1 | 0 |
| Decoding result for a TB in the 1st time unit scheduled by CC1 BWP2 | 1 |
| Decoding result for a TB in the 2nd time unit scheduled by CC1 BWP1 | 2 |
| Decoding result for a TB in the 2nd time unit scheduled by CC1 BWP2 | 3 |
| Decoding result for a TB in the 1st time unit scheduled by CC2 BWP1 | 4 |
| Decoding result for a TB in the 2nd time unit scheduled by CC2 BWP1 | 5 |
| Decoding result for a TB in the 1st time unit scheduled by CC3 BWP1 | 6 |
| Decoding result for a TB in the 1st time unit scheduled by CC3 BWP2 | 7 |
| Decoding result for a TB in the 1st time unit scheduled by CC3 BWP3 | 8 |
| Decoding result for a TB in the 2nd time unit scheduled by CC3 BWP1 | 9 |
| Decoding result for a TB in the 2nd time unit scheduled by CC3 BWP2 | 10 |
| Decoding result for a TB in the 2nd time unit scheduled by CC3 BWP3 | 11 |

FIG. 11

| | |
|---|---|
| Decoding result for a TB in the 1st time unit scheduled by CC1 BWP1 | 0 |
| Decoding result for a TB in the 2nd time unit scheduled by CC1 BWP1 | 1 |
| Decoding result for a TB in the 1st time unit scheduled by CC1 BWP2 | 2 |
| Decoding result for a TB in the 2nd time unit scheduled by CC1 BWP2 | 3 |
| Decoding result for a TB in the 1st time unit scheduled by CC2 BWP1 | 4 |
| Decoding result for a TB in the 2nd time unit scheduled by CC2 BWP1 | 5 |
| Decoding result for a TB in the 1st time unit scheduled by CC3 BWP1 | 6 |
| Decoding result for a TB in the 2nd time unit scheduled by CC3 BWP1 | 7 |
| Decoding result for a TB in the 1st time unit scheduled by CC3 BWP2 | 8 |
| Decoding result for a TB in the 2nd time unit scheduled by CC3 BWP2 | 9 |
| Decoding result for a TB in the 1st time unit scheduled by CC3 BWP3 | 10 |
| Decoding result for a TB in the 2nd time unit scheduled by CC3 BWP3 | 11 |

FIG. 12

| | |
|---|---|
| Decoding result for a TB in the 1st time unit scheduled by CC1 BWP1 | 0 |
| Decoding result for a TB in the 1st time unit scheduled by CC1 BWP2 | 1 |
| Decoding result for a TB in the 1st time unit scheduled by CC2 BWP1 | 2 |
| Decoding result for a TB in the 1st time unit scheduled by CC3 BWP1 | 3 |
| Decoding result for a TB in the 1st time unit scheduled by CC3 BWP2 | 4 |
| Decoding result for a TB in the 1st time unit scheduled by CC3 BWP3 | 5 |
| Decoding result for a TB in the 2nd time unit scheduled by CC1 BWP1 | 6 |
| Decoding result for a TB in the 2nd time unit scheduled by CC1 BWP2 | 7 |
| Decoding result for a TB in the 2nd time unit scheduled by CC2 BWP1 | 8 |
| Decoding result for a TB in the 2nd time unit scheduled by CC3 BWP1 | 9 |
| Decoding result for a TB in the 2nd time unit scheduled by CC3 BWP2 | 10 |
| Decoding result for a TB in the 2nd time unit scheduled by CC3 BWP3 | 11 |

FIG. 13

| #0 | #1 | #2 | #3 | #4 | #5 | #6 | #7 | #8 | #9 |
|----|----|----|---------|---------|---------|---------|----|----|----|
| DL | DL | DL | Dynamic | Dynamic | Dynamic | Dynamic | UL | UL | UL |

| CC1 | D(2,1) | | | | D(3,3) | | | |
|-----|--------|--------|--------|--------|--------|--------|--------|--------|
| CC2 | | | | | | | | |
| CC3 | D(2,2) | | | | | | | |
| CC4 | D(2,1) | | | | D(6,6) | | | |
| CC5 | | D(3,3) | | | | | | |
| CC6 | D(2,1) | | D(4,4) | D(5,5) | | | D(7,7) | |

FIG. 17

METHOD FOR DETERMINING FEEDBACK INFORMATION, TERMINAL DEVICE, AND NETWORK DEVICE

CROSS-REFERENCE TO RELATED APPLICATIONS

This application is a continuation of International Application No. PCT/CN2018/100070, filed on Aug. 10, 2018, which claims priority to Chinese Patent Application No. 201710686826.1, filed on Aug. 11, 2017. The disclosures of the aforementioned patent applications are hereby incorporated by reference in their entireties.

TECHNICAL FIELD

This application relates to the field of wireless communications technologies, and in particular, to a method for determining feedback information, a terminal device, and a network device.

BACKGROUND

To deal with different user requirements, the fifth generation mobile communications system (5G) proposes a concept of network slicing. In a long term evolution (LTE) system, downlink physical layer data is borne by a physical downlink shared channel (PDSCH). To ensure reliability of physical layer data transmission and transmission efficiency, LTE uses a hybrid automatic repeat request (HARQ) mechanism. According to a basic principle of the HARQ mechanism, a receive end feeds back, to a transmit end, a decoding result for data received from the transmit end; and when the data is correctly decoded, the decoding result that is fed back is an acknowledgement (ACK), or otherwise, the decoding result that is fed back is a negative acknowledgement (NACK). The transmit end may retransmit the transport block (TB) after receiving the NACK. In the prior art, the receive end may add, to one piece of uplink control information (UCI), decoding results for a plurality of TBs transmitted by the transmit end, and feed back the UCI to the base station. The plurality of TBs may come from different downlink subframes, different code words in multiple-input multiple-output (MIMO), and different carriers in carrier aggregation. The decoding result included in the UCI is a HARQ feedback codebook, and a bit quantity of the decoding result is a size of the HARQ feedback codebook. In the decoding result, a correspondence between a bit and a TB is an indexing/orchestration manner of a codebook.

To better meet ever-increasing requirements of service types, in the new radio (NR) access technology, in addition to supporting LTE-supported enhanced mobile broadband (eMBB) and broadcast services, two new service types: a massive machine-type communications (mMTC) service and an ultra-reliable and low-latency communications (URLLC) service are also introduced. Because service characteristics, reliability requirements, or latency requirements of different service types vary significantly, requirements on system parameters such as subcarrier spacings and symbol duration of services are different.

In the NR technology, a shorter time unit is used for data transmission. To reduce scheduling control overheads and uplink/downlink transmission switching overheads in time division duplex (TDD), multi-time-unit scheduling, or referred to as time unit aggregation, may be introduced to the NR. To be specific, one piece of downlink control information (DCI) can schedule a plurality of time units, and each time unit may carry one TB or two TBs. Apparently, DCI control overheads can be lower than those in a case in which one time unit is scheduled by one piece of DCI. Because one piece of DCI schedules one time unit in a conventional downlink communications system, a scenario in which one piece of DCI schedules a plurality of time units is not considered in the prior-art technical solution. After multi-time-unit scheduling or time unit aggregation is introduced, the following problem needs to be urgently resolved: How to design HARQ feedback information to ensure understanding consistency (including consistency of bit quantities of feedback information and consistency of decoding results for data in time units corresponding to bit quantities) between the transmit end and the receive end in a scenario of supporting a flexible quantity of aggregated time units, thereby avoiding occurrence of disorder and ensuring communication reliability and robustness.

SUMMARY

This application provides a method for determining feedback information, a terminal device, and a network device, to improve a method for determining HARQ feedback information in an NR system, so as to support a scenario with a flexible quantity of aggregated or scheduled time units, thereby avoiding understanding inconsistency and disorder of the HARQ feedback information between a receive device and a transmit device on a premise of ensuring downlink control overheads and uplink feedback overheads.

According to a first aspect, a method for determining feedback information is provided, including:

obtaining, by a receive end device, control information sent by a transmit end device, where the control information includes time unit aggregation information and downlink assignment index (DAI) indication information, and the DAI indication information includes at least one type of total downlink assignment index (total DAI, T-DAI) indication information and counter downlink assignment index (counter DAI, C-DAI) indication information; determining, by the receive end device, feedback information for at least one transport block based on the time unit aggregation information and the DAI indication information; and sending, by the receive end device, the feedback information for the at least one transport block to the transmit end device.

The receive end device obtains the time unit aggregation information and the DAI indication information that are sent by the transmit end device, determines the feedback information for the at least one transport block based on the time unit aggregation information and the DAI indication information, and finally sends the feedback information for the at least one transport block to the transmit end device. This can improve a manner of determining HARQ feedback information in an NR system, so as to support a scenario with a flexible quantity of aggregated/scheduled time units, thereby avoiding understanding inconsistency and disorder of the feedback information between the receive end device and the transmit end device on a premise of ensuring downlink control overheads and uplink feedback overheads.

In a possible design, the time unit aggregation information includes a maximum quantity of time units that can be scheduled by one piece of downlink control information DCI; and the determining, by the receive end device, feedback information for at least one transport block based on the time unit aggregation information and the DAI indication information includes: determining, by the receive end device, a bit quantity of the feedback information for the at least one transport block based on the T-DAI indication information and the maximum quantity of time units that can be scheduled by one piece of DCI; and orchestrating, by the receive end device based on the C-DAI indication information, feedback information for a transport block in a time unit scheduled by the DCI, to a location corresponding to the C-DAI indication information.

Because the bit quantity of the feedback information is obtained based on the T-DAI indication information and the maximum quantity of time units that is configured for a carrier and that can be scheduled by one piece of DCI, regardless of how many bits scheduled by one piece of DCI, feedback information of the same bit quantity is fed back. Therefore, in a case of DCI loss, disorder of feedback information can be avoided.

In a possible design, the determining, by the receive end device, a bit quantity of the feedback information for the at least one transport block based on the T-DAI indication information and the maximum quantity of time units that can be scheduled by one piece of DCI includes: determining, by the receive end device, that a product of the T-DAI indication information and the maximum quantity of time units that can be scheduled by the one piece of DCI is the bit quantity of the feedback information for the at least one transport block.

The receive end device obtains the bit quantity of the feedback information based on the product of the T-DAI indication information and the maximum quantity of time units that is configured for a carrier and that can be scheduled by one piece of DCI, so that DCI overheads can be reduced and disorder of feedback information is avoided through multi-time-unit scheduling.

In a possible design, the orchestrating, by the receive end device, feedback information for a transport block in a time unit scheduled by the DCI, to a location corresponding to the C-DAI indication information includes: when the maximum quantity of time units that can be scheduled by one piece of DCI is N, and a quantity of time units scheduled by one piece of DCI is X, where optionally, the quantity X of time units scheduled by each piece of DCI is variable, orchestrating, by the receive end device, the feedback information for the transport block in the time unit scheduled by the DCI, to first X bits at the location corresponding to the C-DAI indication information, and setting (N−X) bits following the first X bits to default values, where X is an integer greater than 1 and less than N.

The foregoing arrangement manner of the feedback information can ensure understanding consistency between a transmit end and a receive end in the scenario of supporting a flexible quantity of aggregated time units, thereby avoiding disorder of the feedback information, and reducing DCI indication overheads.

In a possible design, the orchestrating, by the receive end device, feedback information for a transport block in a time unit scheduled by the DCI, to a location corresponding to the C-DAI indication information is specifically: orchestrating, in an order of carriers, feedback information for a transport block in a time unit scheduled by DCI on each carrier in a first time unit. When a plurality of time units are scheduled by the DCI on a currently orchestrated carrier, feedback information for transport blocks in the plurality of time units is first orchestrated, and the plurality of time units include a time unit following the first time unit. Then, feedback information for a transport block in a time unit scheduled by the DCI on a subsequent carrier is orchestrated, the time unit scheduled by the DCI may include the first time unit, and the first time unit is a currently orchestrated time unit. After the feedback information for the transport blocks in the time units scheduled by the DCI on all the carriers in the first time unit is orchestrated, feedback information for a transport block in a time unit, scheduled by the DCI on each carrier, following the first time unit is orchestrated.

The foregoing arrangement manner of the feedback information can ensure understanding consistency between the transmit end and the receive end in the scenario of supporting a flexible quantity of aggregated time units, thereby avoiding disorder of the feedback information.

In a possible design, the time unit aggregation information includes a quantity of time units scheduled by the DCI; and the determining, by the receive end device, feedback information for at least one transport block based on the time unit aggregation information and the DAI indication information is specifically: when the transmit end device configures that the receive end device determines the feedback information according to a dynamic codebook mechanism (in an implementation, determining the feedback information based on a DAI), if a plurality of time units are scheduled by one piece of DCI, performing, by the receive end device, an AND operation on feedback information for transport blocks in the plurality of time units to generate one-bit feedback information; orchestrating, by the receive end device, the one-bit feedback information to the location corresponding to a C-DAI in the DCI; and determining, by the receive end device, the bit quantity of the feedback information for the at least one transport block based on the T-DAI indication information.

The foregoing arrangement manner of the feedback information can ensure understanding consistency between the transmit end and the receive end in the scenario of supporting a flexible quantity of aggregated time units, thereby avoiding disorder of the feedback information, and reducing DCI indication overheads and UCI feedback overheads.

In a possible design, the time unit aggregation information includes a quantity of time units scheduled by the DCI; and the determining, by the receive end device, feedback information for at least one transport block based on the time unit aggregation information and the DAI indication information is specifically: determining, by the receive end device, a bit quantity of the feedback information for the at least one transport block based on the T-DAI indication information; and if a quantity of time units scheduled by one piece of DCI is Y, where Y is an integer greater than or equal to 1, orchestrating, by the receive end device based on the C-DAI indication information, feedback information for transport blocks in the Y time units scheduled by the DCI, to Y bits at the location corresponding to the C-DAI indication information.

The foregoing arrangement manner of the feedback information can ensure understanding consistency between the transmit end and the receive end in the scenario of supporting a flexible quantity of aggregated time units, thereby avoiding disorder of the feedback information, and reducing UCI feedback overheads.

In a possible design, the time unit aggregation information includes whether time unit aggregation is configured; and the determining, by the receive end device, feedback information for at least one transport block based on the time unit aggregation information and the DAI indication information is specifically: determining, by the receive end device based on a T-DAI corresponding to a carrier subset configured with time unit aggregation and a maximum quantity of time units configured for the carrier subset, a bit quantity of feedback information for the carrier subset configured with time unit aggregation; and orchestrating, by the receive end device based on C-DAI indication information in DCI in the carrier subset configured with time unit aggregation, feedback information for a transport block in a time unit scheduled by the DCI, to the feedback information for the carrier subset configured with time unit aggregation; and/or determining, by the receive end device based on a T-DAI corresponding to a carrier subset configured without time unit aggregation, a bit quantity of feedback information for the carrier subset configured without time unit aggregation; orchestrating, by the receive end device based on C-DAI indication information in DCI in the carrier subset configured without time unit aggregation, feedback information for a transport block in a time unit scheduled by the DCI, to the feedback information for the carrier subset configured without time unit aggregation; and combining the feedback information for the carrier subset configured with time unit aggregation and the feedback information for the carrier subset configured without time unit aggregation.

Whether a carrier is configured with time unit aggregation is considered during carrier grouping, and therefore feedback information may be separately determined based on a configuration status of time unit aggregation on each carrier, thereby saving unnecessary DCI indication overheads and UCI feedback overheads.

In a possible design, the time unit aggregation information includes a quantity of aggregated time units configured for a carrier; and the determining, by the receive end device, feedback information for at least one transport block based on the time unit aggregation information and the DAI indication information is specifically: grouping, by the receive end device, carriers into Z subsets based on the quantity of aggregated time units configured for a carrier, where quantities of aggregated time units configured for carriers in one subset are the same; for the $i^{th}$ subset in the Z subsets, determining, by the receive end device, a bit quantity of feedback information for the $i^{th}$ subset based on a T-DAI for the $i^{th}$ subset and a quantity of time units configured for the $i^{th}$ subset; orchestrating, by the receive end device based on C-DAI indication information in DCI in the $i^{th}$ subset, feedback information for a transport block in a time unit scheduled by the DCI, to the feedback information for the $i^{th}$ subset, where i is greater than or equal to 1 and less than or equal to Z; and combining Z pieces of feedback information for the Z subsets, where Z is greater than or equal to 1.

Carriers are grouped into subsets based on information about a quantity of aggregated time units configured on each carrier, and feedback information is separately determined, thereby saving unnecessary DCI indication overheads and UCI feedback overheads.

In a possible design, the time unit aggregation information includes whether a carrier is configured with or without time unit aggregation and/or includes a quantity of aggregated time units configured for a carrier; and the determining, by the receive end device, feedback information based on the time unit aggregation information, the T-DAI indication information, and the C-DAI indication information is specifically: separately determining, by the receive end device, feedback information for a carrier that is configured without time unit aggregation or whose configured quantity of aggregated time units is 1 and for a carrier that is configured with time unit aggregation and/or whose quantity of aggregated time units configured for a carrier is greater than 1.

In a possible design, the receive end device determines, according to a dynamic codebook mechanism, feedback information for the carrier that is configured without time unit aggregation or whose time unit aggregation is disabled or whose configured quantity of aggregated time units is 1. In an implementation, the receive end device determines, based on the T-DAI indication information and the C-DAI indication information, the feedback information for the carrier that is configured without time unit aggregation or whose time unit aggregation is disabled or whose configured quantity of aggregated time units is 1.

In a possible design, the receive end device determines, according to a semi-persistent codebook mechanism, feedback information for the carrier that is configured with time unit aggregation and/or whose time unit aggregation is enabled and/or whose configured quantity of aggregated time units is greater than 1. In an implementation, the receive end device determines, based on the time window information, the feedback information for the carrier that is configured with time unit aggregation and/or whose time unit aggregation is enabled and/or whose configured quantity of aggregated time units is greater than 1.

The foregoing embodiment can ensure understanding consistency between the transmit end and the receive end, support a flexible time unit aggregation configuration, and save unnecessary DCI overheads and UCI feedback overheads.

According to a second aspect, a method for determining feedback information is provided, including:

sending, by a transmit end device, control information to a receive end device, where the control information includes time unit aggregation information and/or DAI indication information, and the DAI indication information includes at least one type of T-DAI indication information and C-DAI indication information; and receiving, by the transmit end device, feedback information for at least one transport block sent by the receive end device, where the feedback information is feedback information generated by the receive end device based on the control information.

In a possible design, the time unit aggregation information includes a maximum quantity of time units that can be scheduled by one piece of downlink control information DCI.

In a possible design, the time unit aggregation information includes a quantity of time units scheduled by DCI.

In a possible design, the time unit aggregation information includes whether a carrier is configured with time unit aggregation and/or includes a quantity of aggregated time units configured for a carrier.

According to a third aspect, a method for determining feedback information is provided, including:

obtaining, by a receive end device, control information sent by a transmit end device, where the control information includes a monitoring period of a control channel or a control channel resource and DAI indication information, and the DAI information includes at least one type of T-DAI indication information and C-DAI indication information;

grouping, by the receive end device, carriers into M subsets based on the monitoring period of a control channel or a control channel resource, where monitoring periods of control channels or control channel resources of carriers in one subset are the same; for the $i^{th}$ subset of the M subsets, determining, by the receive end device, a bit quantity of feedback information for the $i^{th}$ subset based on a T-DAI for the $i^{th}$ subset; orchestrating, by the receive end device based on C-DAI indication information in DCI in the $i^{th}$ subset, feedback information for a transport block in a time unit scheduled by the DCI, to feedback information for each subset, where i is greater than or equal to 1 and less than or equal to M; and combining M pieces of feedback information for the M subsets, where M is greater than or equal to 1; and sending, by the receive end device, the feedback information to the transmit end device.

According to a fourth aspect, a method for determining feedback information is provided, including:

obtaining, by a receive end device, control information sent by a transmit end device, where the control information includes T-DAI indication information and C-DAI indication information, and the T-DAI indication information and/or the C-DAI indication information are counted first in ascending order of carrier indexes, then in ascending order of bandwidth part indexes, and finally in ascending order of time unit indexes; and determining, by the receive end device, feedback information based on the T-DAI indication information and the C-DAI indication information; and sending, by the receive end device, the feedback information to the transmit end device.

In a possible design, the control information includes bandwidth part information and time window information, and the bandwidth part information is a quantity of bandwidth parts that are configured or activated or that can be simultaneously activated on a carrier.

In a possible design, the time window information includes a downlink time unit set that may bear a PDSCH (the feedback information for the PDSCH may be fed back through one piece of target uplink control information), or a set of possible feedback time sequence K1 values.

In a possible design, the determining, by the receive end device, feedback information based on the bandwidth part information and the time window information includes: determining, by the receive end device, a bit quantity of the feedback information based on the quantity of bandwidth parts that are configured or activated or that can be simultaneously activated on a carrier and a time window size.

According to a fifth aspect, a method for determining feedback information is provided, including:

obtaining, by a receive end device, control information sent by a transmit end device, where the control information includes time window information and time unit format information;

determining, by the receive end device, feedback information based on the time window information and the time unit format information; and sending, by the receive end device, the feedback information to the transmit end device.

In a possible design, the time window information includes a downlink time unit set that may bear a PDSCH (the feedback information for the PDSCH may be fed back through one piece of target uplink control information) or a set of possible feedback time sequence K1 values, and the time unit format information includes configured quantity and/or location information of time units for bearing uplink transmission in a time window; and the determining, by the receive end device, feedback information based on the time window information and the time unit format information includes: determining, by the receive end device, a bit quantity of the feedback information based on the time window size and a quantity of time units for bearing uplink transmission configured in the time window.

In the process of determining, by the receive end device, the feedback information based on the time window configured by the base station, a DL/UL transmission direction for a time unit also needs to be considered, thereby avoiding unnecessary feedback overheads.

According to a sixth aspect, a method for determining feedback information is provided, including:

obtaining, by a receive end device, T-DAI indication information and C-DAI indication information that are sent by a transmit end device, where statistics of the T-DAI indication information are collected based on a carrier group, the carrier group includes N subsets, and statistics of the C-DAI indication information are collected based on the subsets in the carrier group; and determining, by the receive end device, a bit quantity of feedback information based on the T-DAI indication information; sequentially cascading feedback information for first (N−1) subsets of the N subsets; orchestrating the feedback information based on the C-DAI indication information in order starting from the first bit of the feedback information, and orchestrating feedback information for the $N^{th}$ subset based on the C-DAI indication information in reverse order starting from the last bit of the feedback information.

According to a seventh aspect, a method for determining feedback information is provided, including:

obtaining, by a receive end device, control information sent by a transmit end device, where the control information includes a configuration parameter of each carrier or bandwidth part and time window information;

determining, by the receive end device, a bit quantity of feedback information based on a configuration parameter relationship of each carrier or bandwidth part and the time window information; and sending, by the receive end device, the feedback information to the transmit end device.

According to an eighth aspect, a method for determining feedback information is provided, including:

obtaining, by a receive end device, first control information and second control information that are sent by a transmit end device, where the first control information includes DAI indication information and indication information of K2, and the second control information includes time window information or minimum value information of K1;

determining, by the receive end device, a bit quantity of feedback information based on the DAI indication information, the indication information of K2, and the time window information or the minimum value information of K1; and sending, by the receive end device, the feedback information to the transmit end device.

In a possible design, the bit quantity of the feedback information is determined by DAI+X, where X is a quantity of remaining time units following a time unit bearing the first control information in the time window.

In a possible design, X=K2−Minimum value of K1.

According to a ninth aspect, a terminal device is provided, including:

a transceiver, configured to: obtain control information sent by a transmit end device, where the control information includes time unit aggregation information and downlink assignment index DAI indication information, and the DAI information includes at least one type of total downlink assignment index T-DAI indication information and counter downlink assignment index C-DAI indication information; and send the feedback information to the transmit end device; and a processor, configured to determine feedback information for at least one transport block based on the time unit aggregation information and the DAI indication information that are obtained by the transceiver, where the transceiver is further configured to send the feedback information for the at least one transport block to the transmit end device.

In a possible design, the time unit aggregation information includes a maximum quantity of time units that can be scheduled by one piece of downlink control information DCI; and when the processor determines the feedback information for the at least one transport block based on the time unit aggregation information and the DAI indication information that are obtained by the transceiver, the processor is specifically configured to:

determine a bit quantity of the feedback information for the at least one transport block based on the T-DAI indication information and the maximum quantity of time units that can be scheduled by one piece of DCI; and orchestrate, based on the C-DAI indication information, feedback information for a transport block in a time unit scheduled by the DCI, to a location corresponding to the C-DAI indication information.

In a possible design, when the processor determines the bit quantity of the feedback information for the at least one transport block based on the T-DAI indication information and the maximum quantity of time units that can be scheduled by one piece of DCI, the processor is specifically configured to:

determine that a product of the T-DAI indication information and the maximum quantity of time units that can be scheduled by one piece of DCI is the bit quantity of the feedback information for the at least one transport block.

In a possible design, when the processor orchestrates the feedback information for the transport block in the time unit scheduled by the DCI, to the location corresponding to the C-DAI indication information, the processor is specifically configured to:

when the maximum quantity of time units that can be scheduled by one piece of DCI is N, and a quantity of time units scheduled by one piece of DCI is X, where X is an integer greater than or equal to 1 and less than or equal to N, orchestrate the feedback information for the transport block in the time unit scheduled by the DCI, to first X bits at the location corresponding to the C-DAI indication information, and set (N−X) bits following the first X bits to default values.

In a possible design, the time unit aggregation information includes a quantity of time units scheduled by DCI; and when the processor determines the feedback information for the at least one transport block based on the time unit aggregation information and the DAI indication information that are obtained by the transceiver, the processor is specifically configured to:

when a plurality of time units are scheduled by one piece of DCI, perform, for the receive end device, an AND operation on feedback information for transport blocks in the plurality of time units to generate one-bit feedback information, and orchestrate the one-bit feedback information to a location corresponding to a C-DAI in the DCI; and determine the bit quantity of the feedback information for the at least one transport block based on the T-DAI indication information.

In a possible design, the time unit aggregation information includes a quantity of time units scheduled by DCI; and when the processor determines the feedback information for the at least one transport block based on the time unit aggregation information and the DAI indication information that are obtained by the transceiver, the processor is specifically configured to:

determine the bit quantity of the feedback information for the at least one transport block based on the T-DAI indication information; and if a quantity of time units scheduled by one piece of DCI is Y, orchestrate, based on the C-DAI indication information, feedback information for transport blocks in the Y time units scheduled by the DCI, to Y bits at the location corresponding to the C-DAI indication information, where Y is an integer greater than or equal to 1.

In a possible design, the time unit aggregation information includes a carrier subset configured with time unit aggregation and/or a carrier subset configured without time unit aggregation; and when the processor determines the feedback information for the at least one transport block based on the time unit aggregation information and the DAI indication information that are obtained by the transceiver, the processor is specifically configured to:

determine, based on a T-DAI corresponding to the carrier subset configured with time unit aggregation and a maximum quantity of time units configured for the carrier subset, a bit quantity of feedback information for the carrier subset configured with time unit aggregation; and orchestrate, based on C-DAI indication information in DCI in the carrier subset configured with time unit aggregation, feedback information for a transport block in a time unit scheduled by the DCI, to the feedback information for the carrier subset configured with time unit aggregation; and/or determine, based on a T-DAI corresponding to the carrier subset configured without time unit aggregation, a bit quantity of feedback information for the carrier subset configured without time unit aggregation; and orchestrate, based on C-DAI indication information in DCI in the carrier subset configured without time unit aggregation, feedback information for a transport block in a time unit scheduled by the DCI, to the feedback information for the carrier subset configured without time unit aggregation; and combine the feedback information for the carrier subset configured with time unit aggregation and the feedback information for the carrier subset configured without time unit aggregation.

In a possible design, the time unit aggregation information includes a quantity of aggregated time units configured for a carrier; and when the processor determines the feedback information for the at least one transport block based on the time unit aggregation information and the DAI indication information that are obtained by the transceiver, the processor is specifically configured to:

group carriers into Z subsets based on the quantity of aggregated time units configured for a carrier, where configured quantities of aggregated time units on all carriers in one subset are the same; and for the $i^{th}$ subset of the Z subsets, determine a bit quantity of feedback information for the $i^{th}$ subset based on a T-DAI for the $i^{th}$ subset and a quantity of time units configured for the $i^{th}$ subset; orchestrate, based on C-DAI indication information in DCI in the $i^{th}$ subset, feedback information for a transport block in a time unit scheduled by the DCI, to feedback information for each subset, where i is greater than or equal to 1 and less than or equal to Z; and combine Z pieces of feedback information for the Z subsets, where Z is greater than or equal to 1.

In a possible design, the time unit aggregation information includes whether a carrier is configured with or without time unit aggregation and/or includes a quantity of aggregated time units configured for a carrier; and when the processor determines the feedback information for the at least one transport block based on the time unit aggregation information and the DAI indication information that are obtained by the transceiver, the processor is specifically configured to:

determine, based on the T-DAI indication information and the C-DAI indication information, feedback information for a carrier that is configured without time unit aggregation or whose configured quantity of aggregated time units is 1; and determine, based on a time window size, feedback information for a carrier that is configured with time unit aggregation and/or whose quantity of aggregated time units configured for a carrier is greater than 1.

According to a tenth aspect, a network device is provided, including a transceiver and a processor, where the processor is configured to control the transceiver to send control information to a receive end device, where the control information includes time unit aggregation information and/or downlink assignment index DAI indication information, and the DAI indication information includes at least one type of total downlink assignment index T-DAI indication information and counter downlink assignment index C-DAI indication information; and the processor is further configured to control the transceiver to receive feedback information sent by the receive end device for at least one transport block, where the feedback information is feedback information generated by the receive end device based on the control information.

In a possible design, the time unit aggregation information includes a maximum quantity of time units that can be scheduled by one piece of downlink control information DCI.

In a possible design, the time unit aggregation information includes a quantity of time units scheduled by DCI.

In a possible design, the time unit aggregation information includes whether a carrier is configured with or without time unit aggregation and/or includes a quantity of aggregated time units configured for a carrier.

According to an eleventh aspect, a communications system is provided, where the communications system includes the terminal device in the ninth aspect and the network device in the tenth aspect.

According to a twelfth aspect, a terminal device is provided, where the terminal device can implement a function of the receive end device in the foregoing method embodiment, the function may be implemented by hardware or by hardware executing corresponding software, and the hardware or the software includes one or more modules corresponding to the foregoing function.

In a possible design, the terminal device includes a processor, a memory, a bus, and a communications interface, where the memory stores a computer-executable instruction; the processor is connected to the memory by using the bus; and when the device runs, the processor executes the computer-executable instruction stored in the memory, so that the device executes the method for determining feedback information in any possible implementation of the first aspect.

In a possible design, the terminal device may be a chip, and the chip includes a processing unit. Optionally, the chip further includes a storage unit, and the chip may be configured to perform the method for determining feedback information in any possible implementation of the first aspect.

According to a thirteenth aspect, a network device is provided, where the network device can implement a function of the receive end device in the foregoing method embodiment, the function may be implemented by hardware or by hardware executing corresponding software, and the hardware or the software includes one or more modules corresponding to the foregoing function.

In a possible design, the network device includes a processor, a memory, a bus, and a communications interface, where the memory stores a computer-executable instruction; the processor is connected to the memory by using the bus; and when the device runs, the processor executes the computer-executable instruction stored in the memory, so that the device executes the method for determining feedback information in any possible implementation of the second aspect.

In a possible design, the network device may be a chip, and the chip includes a processing unit. Optionally, the chip further includes a storage unit, and the chip may be configured to perform the method for determining feedback information in any possible implementation of the second aspect.

According to a fourteenth aspect, a terminal device is provided, where the terminal device can implement a function of the receive end device in the foregoing method embodiment, the function may be implemented by hardware or by hardware executing corresponding software, and the hardware or the software includes one or more modules corresponding to the foregoing function.

In a possible design, the terminal device includes a processor, a memory, a bus, and a communications interface, where the memory stores a computer-executable instruction; the processor is connected to the memory by using the bus; and when the device runs, the processor executes the computer-executable instruction stored in the memory, so that the device executes the method for determining feedback information in any possible implementation of the third aspect.

In a possible design, the terminal device may be a chip, and the chip includes a processing unit. Optionally, the chip further includes a storage unit, and the chip may be configured to perform the method for determining feedback information in any possible implementation of the third aspect.

According to a fifteenth aspect, a terminal device is provided, where the terminal device can implement a function of the receive end device in the foregoing method embodiment, the function may be implemented by hardware or by hardware executing corresponding software, and the hardware or the software includes one or more modules corresponding to the foregoing function.

In a possible design, the terminal device includes a processor, a memory, a bus, and a communications interface, where the memory stores a computer-executable instruction; the processor is connected to the memory by using the bus; and when the device runs, the processor executes the computer-executable instruction stored in the memory, so that the device executes the method for determining feedback information in any possible implementation of the fourth aspect.

In a possible design, the terminal device may be a chip, and the chip includes a processing unit. Optionally, the chip further includes a storage unit, and the chip may be configured to perform the method for determining feedback information in any possible implementation of the fourth aspect.

According to a sixteenth aspect, a terminal device is provided, where the terminal device can implement a function of the receive end device in the foregoing method embodiment, the function may be implemented by hardware or by hardware executing corresponding software, and the hardware or the software includes one or more modules corresponding to the foregoing function.

In a possible design, the terminal device includes a processor, a memory, a bus, and a communications interface, where the memory stores a computer-executable instruction; the processor is connected to the memory by using the bus; and when the device runs, the processor executes the computer-executable instruction stored in the memory, so that the device executes the method for determining feedback information in any possible implementation of the fifth aspect.

In a possible design, the terminal device may be a chip, and the chip includes a processing unit. Optionally, the chip further includes a storage unit, and the chip may be configured to perform the method for determining feedback information in any possible implementation of the fifth aspect.

According to a seventeenth aspect, a terminal device is provided, where the terminal device can implement a function of the receive end device in the foregoing method embodiment, the function may be implemented by hardware or by hardware executing corresponding software, and the hardware or the software includes one or more modules corresponding to the foregoing function.

In a possible design, the terminal device includes a processor, a memory, a bus, and a communications interface, where the memory stores a computer-executable instruction; the processor is connected to the memory by using the bus; and when the device runs, the processor executes the computer-executable instruction stored in the memory, so that the device executes the method for determining feedback information in any possible implementation of the sixth aspect.

In a possible design, the terminal device may be a chip, and the chip includes a processing unit. Optionally, the chip further includes a storage unit, and the chip may be configured to perform the method for determining feedback information in any possible implementation of the sixth aspect.

According to an eighteenth aspect, a terminal device is provided, where the terminal device can implement a function of the receive end device in the foregoing method embodiment, the function may be implemented by hardware or by hardware executing corresponding software, and the hardware or the software includes one or more modules corresponding to the foregoing function.

In a possible design, the terminal device includes a processor, a memory, a bus, and a communications interface, where the memory stores a computer-executable instruction; the processor is connected to the memory by using the bus; and when the device runs, the processor executes the computer-executable instruction stored in the memory, so that the device executes the method for determining feedback information in any possible implementation of the seventh aspect.

In a possible design, the terminal device may be a chip, and the chip includes a processing unit. Optionally, the chip further includes a storage unit, and the chip may be configured to perform the method for determining feedback information in any possible implementation of the seventh aspect.

According to a nineteenth aspect, a terminal device is provided, where the terminal device can implement a function of the receive end device in the foregoing method embodiment, the function may be implemented by hardware or by hardware executing corresponding software, and the hardware or the software includes one or more modules corresponding to the foregoing function.

In a possible design, the terminal device includes a processor, a memory, a bus, and a communications interface, where the memory stores a computer-executable instruction; the processor is connected to the memory by using the bus; and when the device runs, the processor executes the computer-executable instruction stored in the memory, so that the device executes the method for determining feedback information in any possible implementation of the eighth aspect.

In a possible design, the terminal device may be a chip, and the chip includes a processing unit. Optionally, the chip further includes a storage unit, and the chip may be configured to perform the method for determining feedback information in any possible implementation of the eighth aspect.

According to a twentieth aspect, a computer-readable storage medium is provided, including a computer-readable instruction, where when a computer reads and executes the computer-readable instruction, the computer performs the method in any implementation of the first aspect.

According to a twenty-first aspect, a computer-readable storage medium is provided, including a computer-readable instruction, where when a computer reads and executes the computer-readable instruction, the computer performs the method in any implementation of the second aspect.

According to a twenty-second aspect, a computer-readable storage medium is provided, including a computer-readable instruction, where when a computer reads and executes the computer-readable instruction, the computer performs the method in any implementation of the third aspect.

According to a twenty-third aspect, a computer-readable storage medium is provided, including a computer-readable instruction, where when a computer reads and executes the computer-readable instruction, the computer performs the method in any implementation of the fourth aspect.

According to a twenty-fourth aspect, a computer-readable storage medium is provided, including a computer-readable instruction, where when a computer reads and executes the computer-readable instruction, the computer performs the method in any implementation of the fifth aspect.

According to a twenty-fifth aspect, a computer-readable storage medium is provided, including a computer-readable instruction, where when a computer reads and executes the computer-readable instruction, the computer performs the method in any implementation of the sixth aspect.

According to a twenty-sixth aspect, a computer-readable storage medium is provided, including a computer-readable instruction, where when a computer reads and executes the computer-readable instruction, the computer performs the method in any implementation of the seventh aspect.

According to a twenty-seventh aspect, a computer-readable storage medium is provided, including a computer-readable instruction, where when a computer reads and executes the computer-readable instruction, the computer performs the method in any implementation of the eighth aspect.

According to a twenty-eighth aspect, a computer program product is provided, including a computer-readable instruction, where when a computer reads and executes the computer-readable instruction, the computer performs the method in any implementation of the first aspect.

According to a twenty-ninth aspect, a computer program product is provided, including a computer-readable instruction, where when a computer reads and executes the computer-readable instruction, the computer performs the method in any implementation of the second aspect.

According to a thirtieth aspect, a computer program product is provided, including a computer-readable instruction, where when a computer reads and executes the computer-readable instruction, the computer performs the method in any implementation of the third aspect.

According to a thirty-first aspect, a computer program product is provided, including a computer-readable instruction, where when a computer reads and executes the computer-readable instruction, the computer performs the method in any implementation of the fourth aspect.

According to a thirty-second aspect, a computer program product is provided, including a computer-readable instruction, where when a computer reads and executes the computer-readable instruction, the computer performs the method in any implementation of the fifth aspect.

According to a thirty-third aspect, a computer program product is provided, including a computer-readable instruction, where when a computer reads and executes the computer-readable instruction, the computer performs the method in any implementation of the sixth aspect.

According to a thirty-fourth aspect, a computer program product is provided, including a computer-readable instruction, where when a computer reads and executes the computer-readable instruction, the computer performs the method in any implementation of the seventh aspect.

According to a thirty-fifth aspect, a computer program product is provided, including a computer-readable instruction, where when a computer reads and executes the computer-readable instruction, the computer performs the method in any implementation of the eighth aspect.

BRIEF DESCRIPTION OF DRAWINGS

FIG. 6a is a schematic diagram of arrangement of feedback information according to this application;

FIG. 6b is a schematic diagram of arrangement of feedback information according to this application;

FIG. 7a is a schematic diagram of arrangement of feedback information according to this application;

FIG. 7b is a schematic diagram of arrangement of feedback information according to this application;

FIG. 9a is a schematic diagram of arrangement of feedback information according to this application;

FIG. 9b is a schematic diagram of arrangement of feedback information according to this application;

FIG. 11 is a schematic diagram of arrangement of feedback information according to this application;

FIG. 12 is a schematic diagram of arrangement of feedback information according to this application;

FIG. 13 is a schematic diagram of arrangement of feedback information according to this application;

FIG. 17 is a schematic diagram of arrangement of time units according to this application;

DESCRIPTION OF EMBODIMENTS

The following describes the technical solutions of this application with reference to the accompanying drawings in this application. A specific operation method in method embodiments may also be applied to an apparatus embodiment or a system embodiment. In the descriptions of this application, unless otherwise specified, "plurality" indicates at least two.

Architectures and service scenarios described in this application are intended to more clearly describe the technical solutions in this application, but are not intended to limit the technical solutions provided in this application. A person of ordinary skill in the art may know that as the network architectures evolve and a new service scenario emerges, the technical solutions provided in this application are further applied to a similar technical problem.

Figure 1:
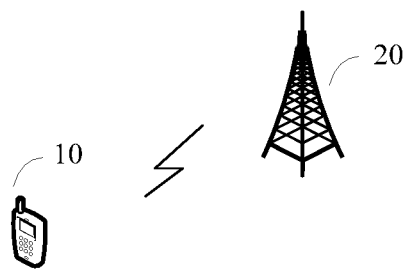
FIG. 1 is a schematic structural diagram of a system architecture according to this application.

FIG. 1 is a schematic diagram of a possible network architecture applicable to this application. The network architecture includes at least one receive end device 10, and the receive end device 10 communicates with a transmit end device 20 through a radio interface. For clarity, FIG. 1 shows only one receive end device and one transmit end device. In the network architecture, the receive end device may be a terminal device, and the transmit end device may be a base station. For ease of description, "terminal device" and "base station" are used in descriptions of subsequent operation method procedures.

The terminal device is a device that has a wireless transmission/reception function, and the terminal device may be deployed on land, for example, an indoor device, an outdoor device, a handheld device, or an in-vehicle device, or may be deployed in the water (for example, on a ship), or may be deployed in the sky (for example, on a plane, a balloon, or a satellite). The terminal may be a mobile phone, a tablet computer (pad), a computer with a wireless transmission/reception function, a virtual reality (VR) terminal, an augmented reality (AR) terminal, a wireless terminal in industrial control, a wireless terminal in a self-driving vehicle, a wireless terminal in telemedicine (remote medical), a wireless terminal in a smart grid, a wireless terminal in transportation safety, a wireless terminal in a smart city, a wireless terminal in a smart home, or the like.

The base station is a device that connects a terminal to a wireless network. The base station includes but is not limited to an evolved NodeB, (eNB), a home evolved NodeB (for example, home evolved nodeB or home node B, HNB), a baseband unit (BBU), a gNodeB (gNB), a transmission/reception point (transmitting and receiving point, TRP), a transmission point (transmitting point, TP), or the like. In addition, the base station may further include a Wi-Fi access point (AP) or the like.

At present, an LTE system includes two transmission modes: frequency division duplex (FDD) and time division duplex (TDD). In an FDD manner of determining feedback information, in a time unit (an LTE time unit is a subframe) n, the base station sends downlink data to the terminal device; and the terminal device feeds back, in a time unit (n+4), whether the feedback information is correctly received. If the data includes only one transport block (transport block, TB), the terminal device feeds back one-bit feedback information; or if there are two TB blocks (two code words) in multiple-input multiple-output (MIMO), the terminal device feeds back two-bit feedback information.

However, in a TDD manner of determining feedback information, the terminal device detects downlink data transmission in a downlink time unit (n−k), and the terminal device sends feedback information in an uplink time unit n, where k∈K (whether data in a plurality of downlink time units is correctly received needs to be fed back in one uplink time unit because a quantity of uplink time units is relatively small), as shown in Table 1.

TABLE 1

| Uplink-downlink configuration | Time unit n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In a case of a TDD configuration of 1, a time unit 7 is an uplink time unit (n=7), and feedback information of whether downlink data in a time unit (n−k) (it may be learned that k is 7 or 6 according to Table 1) is correctly received, that is, feedback information for downlink data in a time unit 0 and a time unit 1, possibly need to be fed back in the time unit 7. If data transmitted to the terminal device includes only one TB, two-bit feedback information is fed back in the time unit 7; or if there are two TB blocks (two code words) in MIMO, four-bit feedback information is fed back.

In conclusion, in TDD system, feedback information for transmission in one or more downlink time units need to be fed back in each uplink time unit, a downlink time unit set whose reception status needs to be fed back is referred to as a time window (also referred to as a bundling window or an associated set in this application), and a quantity of time units included in the set is referred to as a time window size.

In addition, the time window in this application may have the following two interpretations.

1. The time window is a set of downlink time units that possibly bear physical downlink shared channels (PDSCHs). Hybrid automatic repeat request acknowledgements (HARQ-ACKs) for decoding result of the PDSCHs may be borne in one piece of target uplink UCI. In this case, the time window may be determined in relation to K1. For example, for target UCI in a time unit n, a possibly earliest or foremost time unit in a time window corresponding to the time unit n is time unit n−"Maximum value of K1", and a possibly latest or last time unit in the time window corresponding to the time unit n is time unit n−"Minimum value of K1". For example, for an uplink time unit n, if the minimum value of K1 is 2 and the maximum value of K1 is 6, an earliest time unit of a time window corresponding to the uplink time unit n is time unit n−6, and a last time unit of the time window may be time unit n−2. K1 is a time relationship between a time unit for transmitting a PDSCH and a time unit for transmitting a physical uplink control channel (PUCCH) or a physical uplink shared channel (PUSCH). The PUCCH or PUSCH is used to transmit feedback information or UCI for the data. Specifically, if downlink data is sent in the $n^{th}$ time unit on a physical downlink shared channel (PDSCH), a time unit used to transmit acknowledgement information corresponding to the downlink data on a physical uplink shared channel PUSCH or a physical uplink control channel PUCCH is the $(n+K1)^{th}$ time unit.

2. The time window is a set of downlink time units that possibly bear PDCCHs. HARQ-ACKs for decoding result of PDSCHs scheduled by the PDCCHs may be borne in one piece of target uplink UCI. In this case, the time window may be determined in relation to K1 and K0. For example, for target UCI in a time unit n, a possibly earliest or foremost time unit in a time window corresponding to the time unit n is time unit n−"Maximum value of K1"−"Maximum value of K0", and a possibly latest or last time unit in the time window corresponding to the time unit n is time unit n−"Minimum value of K1"−"Minimum value of K0". For example, for an uplink time unit n, if the minimum value of K1 is 2, the maximum value of K1 is 6, the minimum value of K0 is 0, and the maximum value of K0 is 4, an earliest time unit of a time window corresponding to the uplink time unit n is time unit n−6−4, and a last time unit of the time window may be time unit n−2. K0 may be a time relationship between a time unit for transmitting a PDCCH and a time unit for transmitting a physical downlink shared channel PDSCH. Specifically, if scheduling information is sent on the PDCCH in the $n^{th}$ time unit, a time unit used by the PDSCH scheduled by the PDCCH is the $(n+K0)^{th}$ time unit.

An LTE time window is fixed. In other words, the time window is determined based on a TDD uplink-downlink time unit configuration. However, an NR-system time window may be dynamic and configurable. Specifically, K1 and K0 are configured through a combination of radio resource control (RRC) and DCI. In other words, a set of possible values of K1 and/or K0 is configured through semi-persistent RRC signaling, and then specific value information of K1 and/or K0 is notified through DCI signaling.

During carrier aggregation, a terminal device may determine feedback information based on a configured carrier quantity. For example, the terminal device may determine HARQ feedback information based on a total downlink assignment index (T-DAI) and a counter downlink assignment index (C-DAI).

The T-DAI may be, in a time window, a total quantity of {carrier, time unit} pairs scheduled by a PDCCH until a current time unit (and may further include a quantity of PDCCHs used to indicate semi-persistent scheduling release); or a total quantity of PDSCH transmissions until a current time unit; or a total quantity of PDCCH-related PDSCH transmissions (for example, a PDSCH transmission scheduled by a PDCCH) in a current serving cell and/or until a current time unit, and/or, a total quantity of {carrier, time unit} pairs of PDCCHs used to indicate semi-persistent scheduling (SPS) release in a current serving cell and/or until a current time unit; or a total quantity of PDSCHs scheduled by a base station and having corresponding PDCCHs in a current serving cell and/or until a current time unit, and/or, a total quantity of PDCCHS used to indicate semi-persistent scheduling (SPS) release in a current serving cell and/or until a current time unit; or a total quantity of PDSCHs scheduled by a base station in a current serving cell and/or until a current time unit (where the PDSCH is a PDSCH that has a corresponding PDCCH and/or that has a PDCCH used to indicate SPS release); or a total quantity of time units that are scheduled by a base station in a current serving cell and/or until a current time unit and in which PDSCH transmission is performed (where the PDSCH is a PDSCH that has a corresponding PDCCH and/or a PDCCH that indicates SPS release). It should be noted that a carrier in this application may also be referred to as a cell.

The C-DAI is, in a time window, an accumulated quantity of {carrier, time unit}pairs scheduled by a PDCCH until a current time unit (and may further include a quantity of PDCCHs used to indicate SPS release); or an accumulated quantity of PDCCHs until a current time unit; or an accumulated quantity of PDSCH transmissions until a current time unit; or an accumulated quantity of PDCCH-related PDSCH transmissions (for example, a PDSCH transmission scheduled by a PDCCH) in a current serving cell and/or until a current time unit, and/or, an accumulated quantity of {carrier, time unit} pairs of PDCCHs used to indicate semi-persistent scheduling (SPS) release; or an accumulated quantity of PDSCHs scheduled by a base station and having corresponding PDCCHs in a current serving cell and/or until a current time unit, and/or, an accumulated quantity of PDCCHs used to indicate SPS release in a current serving cell and/or until a current time unit; or an accumulated quantity of PDSCHs scheduled by a base station in a current serving cell and/or until a current time unit (where the PDSCH is a PDSCH that has a corresponding PDCCH and/or that has a PDCCH used to indicate SPS release); or an accumulated quantity of time units that are scheduled by a base station in a current serving cell and/or until a current time unit and in which PDSCH transmission is performed (where the PDSCH is a PDSCH that has a corresponding PDCCH and/or a PDCCH that is used to indicate SPS release).

As shown in Table 2, a base station configures five carriers, and each grid represents one time unit. It is assumed that a HARQ time window includes four time units, and a grid filled with D(m,n) represents a time unit in which PDSCH transmission is performed. The PDSCH or the time unit is scheduled by DCI D(m,n), where m represents a value of a total-DAI in DCI that schedules the time unit or the PDSCH, and n represents a value of a counter-DAI in the DCI that schedules the time unit or the PDSCH. It is assumed that PDSCHs or data scheduled by DCI D(1,1), D(3,2), D(4,4), and D(6,6) are correctly received at a receive end, that a PDSCH or data scheduled by DCI D(3,3) is incorrectly received at the receive end, and that the receive end does not detect DCI D(6,5). In the $1^{st}$ time unit in the time window, data is scheduled on only a carrier 1, and therefore T-DAI=1 and C-DAI=1. In the $2^{nd}$ time unit in the time window, data is transmitted on both a carrier 0 and a carrier 2, plus the data transmission in the $1^{st}$ time unit, T-DAI=3, the C-DAI is 2 on the carrier 0, and the C-DAI is 3 on the carrier 2. T-DAIs and C-DAIs in the $3^{rd}$ time unit and the $4^{th}$ time unit can be sequentially obtained. Therefore, final HARQ feedback information includes six bits (which is determined by a finally detected T-DAI in the time window, that is, 6), that is, 110101. For example, 1 represents an ACK, and 0 represents a NACK. Because the receive device does not detect the DCI D(6,5), the receive device first maps feedback information for PDSCHs in detected DCI onto locations corresponding to the C-DAIs (for example, maps data scheduled by the DCI D(1,1) onto the $1^{st}$ bit, that is, an ACK(1)), and a remaining location filled with no information (a location corresponding to C-DAI=5, namely, the $5^{th}$ bit) is filled with NACK. This is an advantage of a DAI mechanism, that is, a data packet loss can be detected, thereby avoiding understanding inconsistency of feedback information between the base station and the UE. A corresponding PDSCH or TB is counted first in frequency domain and then in time domain. In other words, the T-DAI and the C-DAI are counted first in frequency domain and then in time domain. A HARQ-ACK of a TB corresponding to DCI whose DAI value is D(1,1) is the $1^{st}$ bit, a HARQ-ACK of a TB corresponding to DCI whose DAI value is D(3,2) is the $2^{nd}$ bit, and so on. It should be noted that DAI is counted first in frequency domain and then in time domain.

It should be noted that the values 1, 2, 3, 4, 5, and 6 of the T-DAI and the C-DAI in the example of this application are merely used for ease of description herein. In a protocol, indication information in DCI depends on bit quantities of T-DAI and C-DAI fields in the DCI. For example, in LTE, it is assumed that the T-DAI field and the C-DAI field each include two bits, where 1 is represented by 00, 2 is represented by 01, 3 is represented by 10, 4 is represented by 11, 5 is represented by 00, 6 is represented by 01, and soon. Therefore, when a specific value of the T-DAI is calculated, a quantity of repetition times needs to be considered. For example, if the T-DAI field is repeated once and the T-DAI field is 01, it indicates that the value of the T-DAI is 6; or if the T-DAI field is repeated twice and the T-DAI field is 10, it indicates that the value of the T-DAI is 11. The same holds true for the C-DAI, and details are not repeated. For details, refer to Table 3.

TABLE 2

| CC0 | | D(3, 2) Correct | | |
| CC1 | D(1, 1) Correct | | D(4, 4) Correct | D(6, 5) Lost |
| CC2 | | D(3, 3) Incorrect | | D(6, 6) Correct |
| CC3 | | | | |
| CC4 | | | | |

TABLE 3

| DAI field information | C-DAI/T-DAI value corresponding to a DAI field | Actual C-DAI/T-DAI value Y (a quantity of PDCCH-related PDSCH transmissions (for example, a PDSCH transmission scheduled by a PDCCH), and/or, a quantity of {carrier, time unit} pairs of a PDCCH that is used to indicate semi-persistent scheduling (SPS) release) |
|---|---|---|
| 0, 0 | 1 | mod(Y − 1, 4) + 1 = 1 |
| 0, 1 | 2 | mod(Y − 1, 4) + 1 = 2 |
| 1, 0 | 3 | mod(Y − 1, 4) + 1 = 3 |
| 1, 1 | 4 | mod(Y − 1, 4) + 1 = 4 |

To reduce scheduling control overheads and TDD uplink/downlink transmission switching overheads, use of a shorter time unit is considered, and therefore multi-time-unit scheduling, or referred to as time unit aggregation, may be introduced in NR. To be specific, one piece of DCI may schedule a plurality of time units, and each time unit may bear one TB or two TBs. Apparently, DCI control overheads can be lower than those in a case in which one time unit is scheduled by one piece of DCI. Because one piece of DCI schedules one time unit in a conventional downlink communications system, a scenario in which one piece of DCI schedules a plurality of time units is not considered in the prior-art technical solution. After multi-time-unit scheduling or time unit aggregation is introduced, the following problem needs to be urgently resolved: How to design HARQ feedback information to ensure understanding consistency (including consistency of bit quantities of feedback information and consistency of decoding results for data in time units corresponding to bit quantities) between a transmit end and a receive end in a scenario of supporting a flexible quantity of aggregated time units, thereby avoiding occurrence of disorder and ensuring communication reliability and robustness. For example, it is assumed that the receive device receives two pieces of DCI in a time window, that a T-DAI is 3 and a C-DAI is 1 in one piece of DCI, and that a T-DAI is 3 and a C-DAI is 3 in the other piece of DCI. According to the prior art, the receive device may determine that one piece of DCI may be lost, and that a T-DAI is 3 and a C-DAI is 2 in the lost DCI. However, the receive device does not know a specific carrier that corresponds to the lost DCI and a quantity of time units/PDSCHs/TBs that are scheduled by the lost DCI. Consequently, the receive device does not know a quantity of bits that actually need to be fed back, and does not know which corresponding bit information needs to be filled with NACK or discontinuous transmission (DTX). This results in understanding inconsistency between the transmit end and the receive end, occurrence of disorder, and poor robustness of communication.

Based on the foregoing descriptions, the following details the method for determining feedback information provided in this application.

Feedback information in this application may be understood as or represented as a HARQ-ACK bit sequence $\tilde{O}_0^{ACK} \tilde{O}_1^{ACK}, \ldots, \tilde{O}_{O^{ACK}-1}^{ACK}$, where $O^{ACK}$ represents a bit quantity of the feedback information, and $\tilde{O}_i^{ACK}$ represents HARQ-ACK bit information at a location of the $i^{th}$ bit.

Embodiment 1

Figure 2:
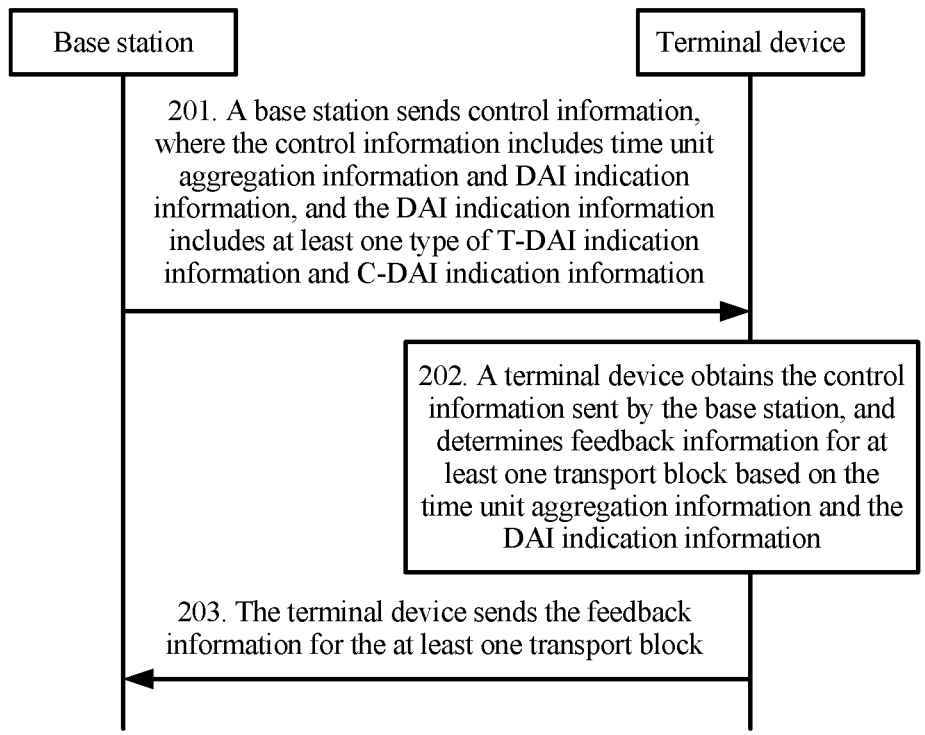
FIG. 2 is a schematic flowchart of a method for determining feedback information according to this application.

FIG. 2 shows a method for determining feedback information provided in this application. The method is applicable to the system architecture shown in FIG. 1, and includes the following steps.

Step 201: A base station sends control information, where the control information includes time unit aggregation information and downlink assignment index DAI indication information, and the DAI indication information includes at least one type of total downlink assignment index T-DAI indication information and counter downlink assignment index C-DAI indication information.

Figure 3:
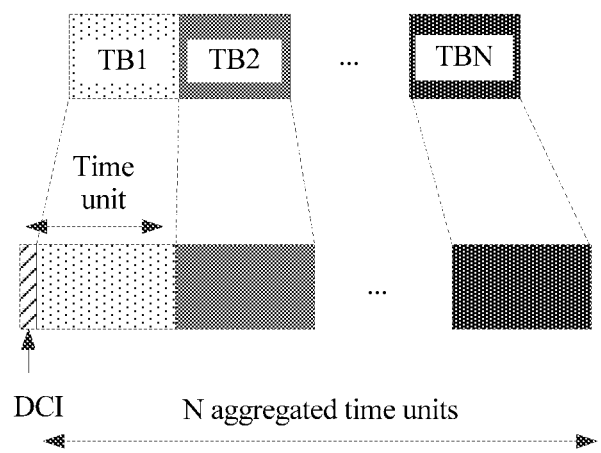
FIG. 3 is a schematic diagram of arrangement of time units according to this application.
Figure 4:
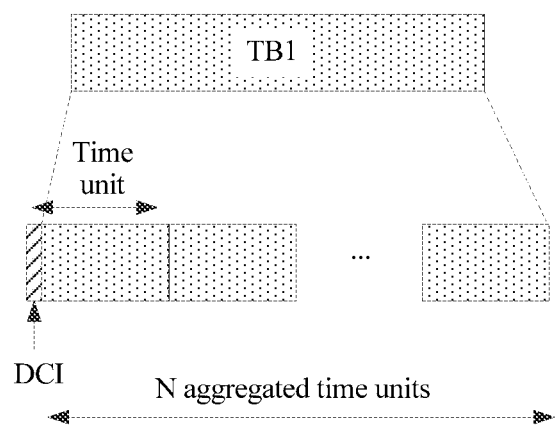
FIG. 4 is a schematic diagram of arrangement of time units according to this application.

In this embodiment of this application, the time unit aggregation information and the downlink assignment index DAI indication information that are included in the control information sent by the base station to a terminal device may be delivered by using one piece of control information. For example, both the time unit aggregation information and the DAI indication information are delivered by using DCI. Alternatively, the time unit aggregation information and the downlink assignment index DAI indication information may be separately included in two pieces of control information. For example, the base station sends RRC signaling or group common DCI to the terminal device, where the RRC signaling or the common DCI (group common DCI) includes the time unit aggregation information; and the base station sends UE-dedicated DCI to the terminal device, where the UE-dedicated DCI includes the DAI indication information. Specifically, there may be two cases for the DAI indication information. Case 1: The DAI indication information includes only a DAI field, and this is applicable to a scenario of determining one piece of carrier feedback information (for example, a scenario of only one carrier configured, or a scenario of determining feedback information for each carrier). A physical meaning of the DAI indication information in this case is similar to that of the C-DAI described above. Case 2: The DAI indication information includes the T-DAI indication information and C-DAI indication information described above. The second case prevails by default in examples of the embodiments of this application, unless otherwise specified, but this is not limited. For the first case, the concept of this application may be directly used. Time unit aggregation may be understood as that a plurality of time units are scheduled by one piece of DCI. In an existing LTE system, one piece of DCI schedules only one downlink time unit. With evolution of communications systems, for various services (for example, short-time services) or working at a higher frequency band, a shorter time unit and/or a wider subcarrier spacing are introduced. To reduce overheads (for example, DCI overheads, or TDD uplink/downlink switching guard interval gap overheads), the base station may configure that one piece of DCI schedules a plurality of time units. A quantity of time units scheduled by the DCI may be referred to as a quantity of aggregated time units, and each time unit may bear one TB (configuring one code word, for example, in a scenario of MIMO with 1 to 4 layers) or two TBs (configuring two code words, for example, in a scenario of MIMO with 5 to 8 layers), as shown in FIG. 3. Alternatively, the plurality of scheduled time units may bear only one TB (configuring one code word, for example, in a scenario of MIMO with 1 to 4 layers) or two TBs (configuring two code words, for example, a scenario of MIMO with 5 to 8 layers), as shown in FIG. 4. This application mainly focuses on the first case, that is, each time unit may bear one TB or two TBs. Therefore, if a system supports the two cases, the first case is used by default (for example, a signaling configuration is that considered in the first case), unless otherwise specified.

In this application, a time unit may be a subframe, a transmission time interval (one transmission time interval equals a sum of duration of several subframes or a sum of several transmission time intervals equals duration of one subframe), one time-domain symbol, a plurality of time-domain symbols, one slot, a plurality of slots, one mini-slot, a plurality of mini-slots, a combination of a mini-slot and a slot, a combination of a symbol and a slot, a combination of a mini-slot and a slot, or the like. Symbol quantities or duration of all time units does not need to be the same. If one time unit bears a PDSCH/PDCCH/UCI or the like, the PDSCH/PDCCH/UCI may not need to fully occupy all time-domain symbols and/or frequency-domain resources of the time unit. In this embodiment of this application, for physical meanings of the T-DAI indication information and the C-DAI indication information, refer to the foregoing descriptions. Details are not described again.

It should be noted that, the description that control information may include T-DAI indication information and C-DAI indication information is used. In a specific application, names may not be limited to "T-DAI" and "C-DAI" provided that a quantity of time units can be indexed. In addition, in a specific implementation solution, the T-DAI and the C-DAI may not coexist. Only one DAI may be required, which is referred to as "DAI". This manner is especially applicable to an application scenario of determining feedback information for each carrier or an application scenario of only one carrier configured. Unless otherwise specified, the description "control information includes T-DAI indication information and C-DAI indication information" is used in this application, which is not limited thereto. For example, the description "control information includes DAI indication information" and the like may also be used.

Step 202: The terminal device obtains the control information sent by the base station, and determines feedback information for at least one transport block based on the time unit aggregation information and the DAI indication information.

The feedback information for the at least one transport block is a hybrid automatic repeat request HARQ-ACK, that is, a HARQ-ACK bit sequence $\tilde{O}_0^{ACK}$ $\tilde{O}_1^{ACK}$, . . . , $\tilde{O}_{O^{ACK}-1}^{ACK}$, for the transport block.

In this embodiment of this application, based on different time unit aggregation information, the following details a procedure of determining the feedback information for the at least one transport block in a plurality of manners.

Manner 1

In this manner, the time unit aggregation information includes a maximum quantity of time units that can be scheduled by one piece of DCI. A size of the feedback information is related to a maximum quantity of aggregated time units configured by the base station. Therefore, when obtaining the maximum quantity of time units that can be scheduled by one piece of DCI, the terminal device may determine a bit quantity of the feedback information for the at least one transport block based on the T-DAI indication information and the maximum quantity of time units that can be scheduled by one piece of DCI. Specifically, the terminal device may determine the bit quantity of the feedback information for the at least one transport block based on a product of the T-DAI indication information and the maximum quantity of time units that can be scheduled by one piece of DCI. Examples are described as follows:

(1) In a case of two TBs or two code words configured on at least one carrier or in at least one time unit (spatial bundling is disabled if spatial bundling needs to be considered, for example, in LTE, spatial bundling (spatialBundling) is set to false or a control message sent by the terminal device to the base station does not exceed one threshold (for example, a capacity of the uplink control message)), the final bit quantity $O^{ACK}$ of the feedback information is 2T-DAI*N.

(2) In a case of two TBs or two code words configured on at least one carrier or in at least one time unit and spatial bundling enabled (for example, in LTE, spatialBundling-PUCCH is set to true or a control message sent by the terminal device to the base station exceeds one threshold (for example, a capacity of the uplink control message)), the final bit quantity $O^{ACK}$ of the feedback information is T-DAI*N.

(3) In a case of one TB or one code word configured on each carrier or in each time unit, the final bit quantity $O^{ACK}$ of the feedback information is T-DAI*N.

It should be noted: 1. In the foregoing cases, a code block group (CBG) feedback is not considered, that is, it is assumed that only one bit is fed back for one TB or that one TB includes only one CBG. In a case in which a CBG feedback is configured, a feedback bit quantity or a CBG quantity for each TB needs to be additionally considered on the basis of this application. 2. If SPS PDSCH transmission is activated and the receive device needs to receive an SPS PDSCH in a time window, decoding result information may be further fed back for the SPS PDSCH. 3. For ease of description, it is assumed that one code word or one TB is configured, CBG feedback is disabled, no SPS PDSCH transmission is performed, configuration parameters (numerology) of all carriers are the same, and duration of time units is the same, unless otherwise specified. 4. If a restriction on an actual bit quantity of a T-DAI field is considered, an actual value of a T-DAI is $Lj+V_{T-DAI}^{DL}$, where $V_{T-DAI}^{DL}$ represents a value of the T-DAI field in DCI, j represents j times of repetition of the T-DAI field, and L depends on a bit quantity of the T-DAI field. For example, in LTE, in a case of two bits, the corresponding L is 4, or in a case of four bits, the corresponding L is 16 (counting for L times is a cycle). The same holds true for all the embodiments in this specification, and details are not described again.

In addition, the description "a maximum quantity of time units that can be scheduled by one piece of DCI" in this application has the following interpretations:

(1) After a quantity of aggregated time units is configured through higher layer signaling (for example, RRC signaling), a quantity of time units scheduled by each piece of DCI is fixedly the quantity of aggregated time units configured through the higher layer signaling. Therefore, "a maximum quantity of time units that can be scheduled by one piece of DCI" may be understood as "a quantity of time units that can be scheduled by one piece of DCI".

(2) After a quantity of aggregated time units is configured through higher layer signaling (for example, RRC signaling), a quantity of time units scheduled by each piece of DCI is variable, for example, each piece of DCI may indicate value information of the time units scheduled by the DCI, provided that the value is less than or equal to the quantity of aggregated time units configured through the higher layer signaling. Therefore, "a maximum quantity of time units that can be scheduled by one piece of DCI" may be understood as "a maximum quantity of time units that can be scheduled by one piece of DCI".

(3) In this application, the time unit aggregation information may be not only indicated through explicit signaling, but also obtained implicitly. In other words, the quantity of time units may be not only indicated through explicit signaling but also implicitly indicated. For example, a bitmap in DCI may be used to represent a scheduled time unit (1110 represents that the first three time units are scheduled, so that time unit quantity information and/or scheduled time unit information can be implicitly obtained). For another example, DCI and/or RRC may configure an offset between a start time unit for data transmission and a PDCCH and an offset between an end time unit and the PDCCH (time unit quantity information and/or scheduled time unit information can be implicitly obtained based on the start and end information).

(4) The maximum quantity of time units that can be scheduled by one piece of DCI may be configured for each carrier. For example, the maximum quantity of time units that can be scheduled by one piece of DCI configured for the $i^{th}$ carrier is Ni; or only a maximum quantity N of time units that can be scheduled by one piece of DCI is configured and applied to all carriers. In a case of configuring Ni for each carrier, the maximum quantity N of time units that can be scheduled by one piece of DCI is a maximum value of Ni in this application. In a case of configuring only the maximum quantity of time units that can be scheduled by one piece of DCI for all the carriers, the maximum quantity of time units that can be scheduled by one piece of DCI is N in this application.

(5) The maximum quantity of time units that can be scheduled by one piece of DCI may be alternatively system-defined, in other words, the maximum quantity does not need to be notified through signaling, but only whether to enable time unit aggregation needs to be configured through signaling.

If whether to enable time unit aggregation is configured through signaling, the following solution is considered when time unit aggregation is set to be enabled. Other embodiments of this application are similar, and details are not described again.

The terminal device orchestrates, based on the C-DAI indication information, HARQ-ACK information for a transport block in a time unit scheduled by DCI, to a location corresponding to the C-DAI indication information. In other words, one piece of DCI includes the C-DAI indication information, and information at a location corresponding to the C-DAI indication information is HARQ-ACK information for a transport block in a time unit scheduled by the DCI (the orchestration action is optional). During orchestration of feedback information, if the maximum quantity of time units that can be scheduled by one piece of DCI is N, and the quantity of time units scheduled by one piece of DCI is X, where X is an integer greater than or equal to 1 and less than or equal to N, the terminal device may orchestrate the HARQ-ACK information for the transport block in the time unit scheduled by the DCI to the first X bits at the location corresponding to the C-DAI indication information, and set (N−X) bits following the X bits to default values. In other words, the terminal device orchestrates the HARQ-ACK information for the transport block in the time unit scheduled by the DCI to the first X bits of the N-bit feedback information that is fed back, and sets a location following the X bits to a default value. Alternatively, in other words, the first X bits at the location corresponding to the C-DAI indication information is the HARQ-ACK information for the transport block in the X time units scheduled by the DCI that includes the C-DAI, and (N−X) bits following the first X bits are default values. The HARQ-ACK information is a decoding result for data transmitted on the transport block. For example, correct reception or an ACK is represented by 1, and incorrect reception or a NACK is represented by 0 (this is merely an example, and is not limited in this specification. For example, the ACK may be represented by 0 and the NACK may be represented by 1).

The location corresponding to the C-DAI indication information may be determined in the following possible manners.

A case with one code word or one TB configured and CBG feedback disabled is considered. It is assumed that $V_{C-DAI,c,m}$ is a value of a C-DAI field in the DCI, and that the DCI is DCI that schedules a carrier c and that corresponds to data transmission (PDSCH) in the $m^{th}$ time unit in a time window, or DCI that is borne in the $m^{th}$ time unit in a time window and that schedules a carrier c, or DCI that is borne on a carrier c in the $m^{th}$ time unit in a time window. Therefore, the corresponding location determined based on the C-DAI indication information is $N*(Lj+V_{C-DAI,c,m}^{DL}-1)$, where j represents j times of repetition of the C-DAI, and L depends on a bit quantity of the C-DAI field. For example, in LTE, in a case of two bits, the corresponding L is 4, or in a case of four bits, the corresponding L is 16 (counting for L times is a cycle). N is the maximum quantity, determined in this manner, of time units that can be scheduled by one piece of DCI.

A case with CBG feedback disabled and two TBs or two code words configured on at least one carrier or in at least one time unit (spatial bundling is disabled if spatial bundling needs to be considered, for example, in LTE, spatial-BundlingPUCCH is set to false or a control message sent by the terminal device to the base station does not exceed one threshold (for example, a capacity of the uplink control message)) is considered. It is assumed that $V_{C-DAI,c,m}$ is a value of a C-DAI in the DCI, and that the DCI is DCI that schedules a carrier c and that corresponds to data transmission in the $m^{th}$ time unit in a time window, or DCI that is borne in the $m^{th}$ time unit in a time window and that schedules a carrier c, or DCI that is borne on a carrier c in the $m^{th}$ time unit in a time window. Therefore, the corresponding location determined based on the C-DAI indication information is $2N*(Lj+V_{C-DAI,c,m}^{DL}-1)$, where j represents j times of repetition of the C-DAI, and L depends on a bit quantity of the C-DAI field. For example, in LTE, in a case of two bits, the corresponding L is 4, or in a case of four bits, the corresponding L is 16 (counting for L times is a cycle). N is the maximum quantity, determined in this manner, of time units that can be scheduled by one piece of DCI.

It should be noted that the foregoing formulas merely represent calculation results, and a specific calculation process may not be strictly performed according to the foregoing formulas. For example, a calculation result may be represented as $N*Lj+N*V_{C-DAI,c,m}^{DL}-N$ or another form. This is not limited in this application.

To more clearly describe a location, in feedback information, of HARQ-ACK information for a transport block in each time unit, the following details manners of orchestrating feedback information.

The terminal device orchestrates, in an order of carriers, HARQ-ACK information for a transport block in a time unit scheduled by DCI on each carrier in a first time unit. When a plurality of time units are scheduled by the DCI on a currently orchestrated carrier, HARQ-ACK information for transport blocks in the plurality of time units is first orchestrated, and the plurality of time units include a time unit following the first time unit. Then, HARQ-ACK information for a transport block in a time unit scheduled by the DCI on a subsequent carrier is orchestrated, the time unit scheduled by the DCI may include the first time unit, and the first time unit is a currently orchestrated time unit. After the HARQ-ACK information for the transport blocks in the time units scheduled by the DCI on all the carriers in the first time unit is orchestrated, HARQ-ACK information for a transport block in a time unit, scheduled by the DCI on each carrier, following the first time unit is orchestrated, where previously orchestrated HARQ-ACK information is skipped.

Figure 5A:
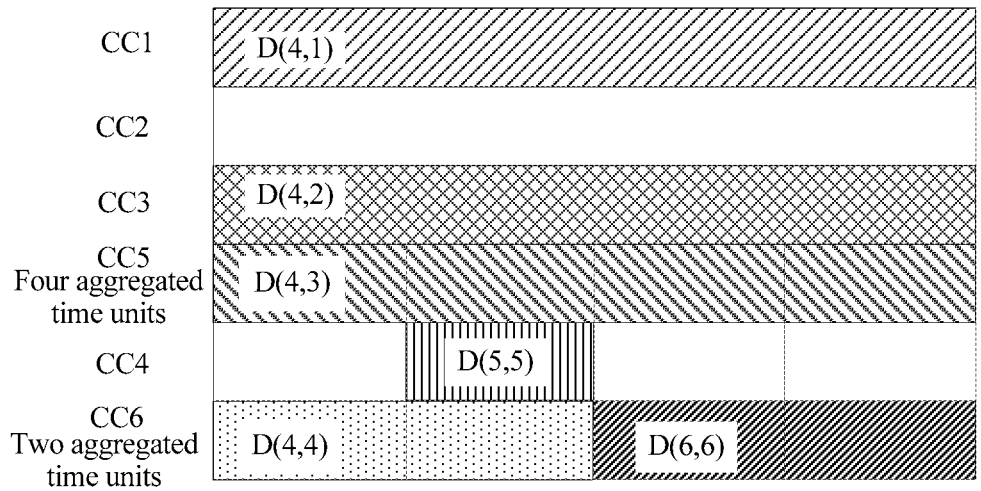
FIG. 5a is a schematic diagram of arrangement of time units according to this application.
Figure 5B:
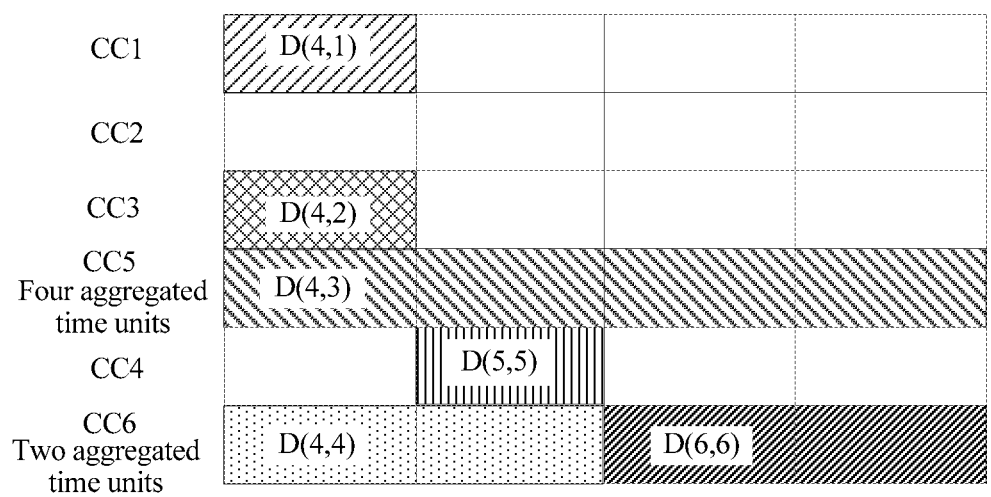
FIG. 5b is a schematic diagram of arrangement of time units according to this application.

For example, FIG. 5a and FIG. 5b show two schematic arrangement diagrams of time units scheduled by DCI. Different time units are configured for a CC1, a CC2, a CC3, a CC4, a CC5, and a CC6 shown in FIG. 5a. A same short time unit is configured for all CCs shown in FIG. 5b. As shown in FIG. 5a or FIG. 5b, it is assumed that the maximum quantity N of time units that can be scheduled by one piece of DCI is 4. In a time window, the receive device detects that a value of the last T-DAI is 6, and therefore determines that the feedback bit quantity is 6*4=24.

In FIG. 5a or FIG. 5b, a time unit in the first column is a first time unit, that is, a currently orchestrated time unit. Based on the C-DAI indication information, HARQ-ACK information for a transport block in a current time unit D(4,1) on the CC1 is first orchestrated, and the HARQ-ACK information is located in the $0^{th}$ bit of feedback information (a location corresponding to a C-DAI is $N*(Lj+V_{C-DAI,c,m}^{DL}-1)=4*0=0$, where $V_{C-DAI,c,m}=1$, L=4, and j=0). Because the DCI schedules only one time unit, the first bit of N bits starting from the $0^{th}$ bit corresponds to the feedback information for the TB in the time unit scheduled by the DCI, and the remaining three bits may be filled with default values (for example, ACK, NACK, DTX, 1, or 0). Then, HARQ-ACK information for a transport block in a current time unit D(4,2) on the CC3 is orchestrated, and the HARQ-ACK information is located in the $4^{th}$ bit of the feedback information (a location corresponding to a C-DAI is $N*(Lj+V_{C-DAI,c,m}^{DL}-1)=4*1=4$, where $V_{C-DAI,c,m}=2$, L=4, and j=0). Because the DCI schedules only one time unit, the first bit of N bits starting from the $4^{th}$ bit corresponds to the feedback information for the TB in the time unit scheduled by the DCI, and the remaining three bits may be filled with default values (for example, ACK, NACK, DTX, 1, or 0). When the CC5 is orchestrated, DCI on the CC5 schedules four time units. After HARQ-ACK information for a transport block in a current time unit scheduled by the DCI is orchestrated, HARQ-ACK information for transport blocks in three time units following the current time unit on the CC5 is continuously orchestrated, and then HARQ-ACK information for a transport block in a time unit in the first piece of DCI on the CC6 is orchestrated. Specifically, HARQ-ACK information for a transport block in a current time unit D(4,3) on the CC5 is orchestrated, and the HARQ-ACK information is located in the $8^{th}$ bit of the feedback information (a location corresponding to a C-DAI is $N*(Lj+V_{C-DAI,c,m}^{DL}-1)=4*2=8$, where $V_{C-DAI,c,m}=3$, L=4, and j=0). Because the DCI schedules four time units, N bits starting from the $8^{th}$ bit are feedback information for data in the four time units scheduled by the DCI. On the CC4, a time unit in the first column is not scheduled, but a time unit in the second column is scheduled. Therefore, the terminal device needs to skip the CC4, and first orchestrates HARQ-ACK information for a transport block in a time unit in the first piece of DCI on the CC6. After orchestrating the time unit in the first piece of DCI on the CC6, the terminal device orchestrates HARQ-ACK information for a transport block in a time unit scheduled by DCI on the CC4. Finally, the terminal device orchestrates HARQ-ACK information for a transport block in a time unit in the second piece of DCI on the CC6. Specific location information is shown in FIG. 6a.

In this application, feedback information for data in a later time unit may be arranged before feedback information for data in an early time unit. For example, feedback information in the $2^{nd}$ time unit on the CC5 is arranged before feedback information in the $1^{st}$ time unit on the CC6 for ease of organization and management, thereby avoiding understanding inconsistency between a transmit device and a receive device. It should be noted: 1. In a case of DCI loss, a location corresponding to a C-DAI of the DCI is filled with no information (because the DCI and the C-DAI are lost). The location filled with no feedback information may be filled with NACK or DTX (data packet or DCI loss is mainly considered herein). 2. In a case with two TBs or two code words configured, a 2N-bit feedback message needs to be arranged at a location corresponding to a C-DAI. First N bits may be organized to correspond to the first TB or N bits of the first code word (if only X time units are scheduled, the first X bits are corresponding feedback information, and the following (N−X) bits are default values); and the following N bits are organized to correspond to the second TB or N bits of the second code word (if only X time units are scheduled, the first X bits are corresponding feedback information, and the following (N−X) bits are default values). Alternatively, the 2N bits of the feedback information may be alternately arranged. For example, N bits at odd-numbered locations correspond to the first TB or N bits of the first code word, and N bits at even-numbered locations correspond to the second TB or N bits of the second code word; or N bits at even-numbered locations correspond to the first TB or N bits of the first code word, and N bits at odd-numbered locations correspond to the second TB or N bits of the second code word. 3. In the foregoing examples, the values 5 and 6 for the T-DAI and the C-DAI may be used for ease of description. In a protocol, indication information in DCI depends on bit quantities of T-DAI and the C-DAI fields in the DCI. For example, in LTE, it is assumed that both the T-DAI field and the C-TDAI field include two bits, and therefore 5 should be corrected to 1, representing the C-DAI field is repeated once (j=1 and $V_{C-DAI,c,m}=1$); and 6 may be corrected to 2, representing the C-DAI field is repeated twice (j=1 and $V_{C-DAI,c,m}=2$). 4. In the foregoing examples, a start bit is set to the $0^{th}$ bit, but this is not limited during implementation. For example, the start bit may be set to the $1^{st}$ bit (if so, the corresponding formula or calculation result needs to be adjusted, and details are not described).

For example, as shown in FIG. 5a or FIG. 5b, after DCI D(4,2) is lost (the receive device does not detect the DCI), HARQ-ACK information for a transport block in a current time unit D(4,1) on the CC1 is first orchestrated based on the C-DAI indication information, and the HARQ-ACK information is located in the $0^{th}$ bit of the feedback information (a location corresponding to a C-DAI is $N*(Lj+V_{C-DAI,c,m}^{DL}-1)=4*0=0$, where $V_{C-DAI,c,m}=1$, L=4, and j=0). Because the DCI schedules only one time unit, the first bit of N bits starting from the $0^{th}$ bit corresponds to feedback information for the TB in the time unit scheduled by the DCI, and the remaining three bits may be filled with default values (for example, ACK, NACK, DTX, 1, or 0). When the CC5 is orchestrated, DCI on the CC5 schedules four time units. After HARQ-ACK information for a transport block in a current time unit scheduled by the DCI is orchestrated, HARQ-ACK information for transport blocks in three time units following the current time unit on the CC5 is continuously orchestrated, and then HARQ-ACK information for a transport block in a time unit in the first piece of DCI on the CC6 is orchestrated. Specifically, HARQ-ACK information for a transport block in a current time unit D(4,3) on the CC5 is orchestrated, and the HARQ-ACK information is located in the $8^{th}$ bit of the feedback information (a location corresponding to a C-DAI is $N*(Lj+V_{C-DAI,c,m}^{DL}-1)=4*2=8$, where $V_{C-DAI,c,m}=3$, L=4, and j=0). Because the DCI schedules four time units, N bits starting from the $8^{th}$ bit are feedback information for data in the four time units scheduled by the DCI. On the CC4, a time unit in the first column is not scheduled, but a time unit in the second column is scheduled. Therefore, the terminal device needs to skip the CC4, and first orchestrates HARQ-ACK information for a transport block in a time unit in the first piece of DCI on the CC6. After orchestrating the time unit in the first piece of DCI on the CC6, the terminal device orchestrates HARQ-ACK information for a transport block in a time unit scheduled by DCI on the CC4. Finally, the terminal device orchestrates HARQ-ACK information for a transport block in a time unit in the second piece of DCI on the CC6. Then, in 24 bits, locations filled with no HARQ-ACK bits are filled with NACK. To be specific, locations (four bits starting with the $4^{th}$ bit) corresponding to a C-DAI in the DCI D(4,2) are filled with NACK because the DCI is not detected. Therefore, a location corresponding to a C-DAI (the location corresponding to the C-DAI is N*(Lj+$V_{C-DAI,c,m}^{DL}$−1)=4*1=4, where $V_{C-DAI,c,m}^{DL}$=2, L=4, and j=0) is filled with no HARQ-ACK bit. Specific location information is shown in FIG. 6b.

Beneficial effects of this application are that indication overheads of a C-DAI and a T-DAI in DCI are reduced in a scenario of supporting a flexible quantity of aggregated/scheduled time units. In the foregoing examples, the C-DAI/T-DAI field requires only two bits; otherwise, the bit quantity of the C-DAI/T-DAI field should be at least greater than $\log_2(N)$, as described in Manner 3. In addition, in this manner, for a carrier that is configured without time aggregation or DCI that schedules only one time unit, feedback information also needs to be determined based on N. Therefore, in a case of DCI loss, this can avoid understanding inconsistency between a receive device and a transmit device (it is determined that N bits need to be fed back regardless of the DCI lost on any carrier).

Manner 2

In this manner, the time unit aggregation information may include a quantity of time units scheduled by DCI or a time unit scheduled by DCI.

A size of feedback information is unrelated to a quantity of aggregated time units. Similar to the case of one code word configured in an LTE system, a bit quantity $O^{ACK}$ of the feedback information is a value of a T-DAI.

When a base station configures a dynamic codebook (or referred to as determining HARQ-ACK information in a dynamic manner; and in a manner, for example, determines HARQ-ACK information based on a DAI) for a terminal device, optionally, when at least two carriers are configured, if one piece of DCI schedules a plurality of time units, the terminal device performs an AND operation on HARQ-ACK information for transport blocks in the plurality of time units, to generate one-bit HARQ-ACK information; and then orchestrates the one-bit HARQ-ACK information to a location corresponding to a C-DAI in the DCI. In other words, information at the location corresponding to the C-DAI in the DCI is the one-bit HARQ-ACK information (the orchestration action is optional). The terminal device determines a bit quantity of the feedback information based on T-DAI indication information.

A process of determining the location corresponding to the C-DAI indication information may be as follows.

A case with one code word or one TB configured and CBG feedback disabled is considered. It is assumed that $V_{C-DAI,c,m}$ is a value of a C-DAI in the DCI, and that the DCI is DCI that schedules a carrier c and that corresponds to data transmission in the $m^{th}$ time unit in a time window, or DCI that is borne in the $m^{th}$ time unit in a time window and that schedules a carrier c, or DCI that is borne on a carrier c in the $m^{th}$ time unit in a time window. Therefore, the corresponding location determined based on the C-DAI indication information is Lj+$V_{C-DAI,c,m}^{DL}$−1, where j represents j times of repetition of the C-DAI, and L depends on a bit quantity of the C-DAI field. For example, in LTE, in a case of two bits, the corresponding L is 4, or in a case of four bits, the corresponding L is 16 (counting for L times is a cycle).

A case with CBG feedback disabled and two TBs or two code words configured on at least one carrier or in at least one time unit (spatial bundling is disabled if spatial bundling needs to be considered, for example, in LTE, spatial-BundlingPUCCH is set to false or a control message sent by the terminal device to the base station does not exceed one threshold (for example, a capacity of the uplink control message)) is considered. It is assumed that $V_{C-DAI,c,m}$ is a value of a C-DAI in the DCI, and that the DCI is DCI that schedules a carrier c and that corresponds to data transmission in the $m^{th}$ time unit in a time window, or DCI that is borne in the $m^{th}$ time unit in a time window and that schedules a carrier c, or DCI that is borne on a carrier c in the $m^{th}$ time unit in a time window. Therefore, the corresponding location determined based on the C-DAI indication information is Lj+$V_{C-DAI,c,m}^{DL}$−1, where j represents j times of repetition of the C-DAI, and L depends on a bit quantity of the C-DAI field. For example, in LTE, in a case of two bits, the corresponding L is 4, or in a case of four bits, the corresponding L is 16 (counting for L times is a cycle).

It should be noted that the foregoing formulas merely represent calculation results, and a specific calculation process may not be strictly performed according to the foregoing formulas. This is not limited in this application.

In Manner 2, the manner of determining the bit quantity of the feedback information is similar to that in the LTE system. To be specific, in a case with one code word configured, the bit quantity of the feedback information is a value of a T-DAI, in other words, only one bit is fed back for a plurality of time units scheduled by each piece of DCI. A difference lies in that the one bit is a result of an "AND" operation performed on HARQ-ACK information for transport blocks in the plurality of time units scheduled by the DCI. For example, one piece of DCI schedules three time units, and when decoding results for transport blocks in the three time units are an ACK(1), an ACK(1), and an ACK(1), after an "AND" operation is performed on the decoding results, a decoding result is still an ACK(1). However, when time units for transport blocks in the three time units are an ACK(0), an ACK(1), and an ACK(1), after an "AND" operation is performed on the decoding results, a decoding result is a NACK(0).

For example, as shown in FIG. 5a or FIG. 5b, in the time window, the receive device detects that a value of the last T-DAI is 6, and therefore the receive device determines that the feedback bit quantity $O^{ACK}$ is 6.

In FIG. 5a or FIG. 5b, a time unit in the first column is a first time unit, that is, a currently orchestrated time unit. HARQ-ACK information for a transport block in a current time unit D(4,1) on the CC1 is first orchestrated based on the C-DAI indication information, and the HARQ-ACK information is located in the $0^{th}$ bit of feedback information (a location corresponding to a C-DAI is Lj+$V_{C-DAI,c,m}^{DL}$−1=0, where $V_{C-DAI,c,m}$=1, L=4, and j=0). Because the DCI schedules only one time unit, the $0^{th}$ bit corresponds to the feedback information for the TB in the time unit scheduled by the DCI. Then, HARQ-ACK information for a transport block in a current time unit D(4,2) on the CC3 is orchestrated, and the HARQ-ACK information is located in the $1^{st}$ bit of the feedback information (a location corresponding to a C-DAI is Lj+$V_{C-DAI,c,m}^{DL}$−1=0, where $V_{C-DAI,c,m}$=2, L=4, and j=0). Because the DCI schedules only one time unit, the $1^{st}$ bit corresponds to the feedback information for the TB in the time unit scheduled by the DCI. When the CC5 is orchestrated, DCI on the CC5 schedules four time units. Specifically, the HARQ-ACK information for the transport block in a current time unit D(4,3) on the CC5 is orchestrated, and the HARQ-ACK information is located in the $2^{nd}$ bit of the feedback information (a location corresponding to a C-DAI is Lj+$V_{C-DAI,c,m}^{DL}$−1=0, where $V_{C-DAI,c,m}$=3, L=4, and j=0). Because the DCI schedules four time units, the $3^{rd}$ bit is a result of an "AND" operation performed on feedback information for data in the four time units scheduled by the DCI. On the CC4, a time unit in the first column is not scheduled, but a time unit in the second column is scheduled. Therefore, the terminal device needs to skip the CC4, and first orchestrates HARQ-ACK information for a transport block in a time unit in the first piece of DCI on the CC6. After orchestrating the time unit in the first piece of DCI on the CC6, the terminal device orchestrates HARQ-ACK information for a transport block in a time unit scheduled by DCI on the CC4. Finally, the terminal device orchestrates HARQ-ACK information for a transport block in a time unit in the second piece of DCI on the CC6. Specific location information is shown in FIG. 7a.

In a case of DCI loss, a location corresponding to a C-DAI in the DCI is filled with no information (because the DCI and the C-DAI are lost), and the location filled with no feedback information may be filled with NACK or DTX.

For example, as shown in FIG. 5a or FIG. 5b, after the DCI D(4,2) is lost, HARQ-ACK information for a transport block in a current time unit D(4,1) on the CC1 is first orchestrated based on the C-DAI indication information, and the HARQ-ACK information is located in the $0^{th}$ bit of the feedback information (a location corresponding to a C-DAI is $Lj+V_{C-DAI,c,m}^{DL}-1=0$, where $V_{C-DAI,c,m}=1$, L=4, and j=0). Because the DCI schedules only one time unit, the $0^{th}$ bit corresponds to feedback information for the TB in the time unit scheduled by the DCI. When the CC5 is orchestrated, DCI on the CC5 schedules four time units. Specifically, HARQ-ACK information for a transport block in a current time unit D(4,3) on the CC5 is orchestrated, and the HARQ-ACK information is located in the $2^{nd}$ bit of the feedback information (a location corresponding to a C-DAI is $Lj+V_{C-DAI,c,m}^{DL}-1=0$, where $V_{C-DAI,c,m}=3$, L=4, and j=0). Because the DCI schedules four time units, the $3^{rd}$ bit is a result of an "AND" operation performed on feedback information for data in the four time units scheduled by the DCI. On the CC4, a time unit in the first column is not scheduled, but a time unit in the second column is scheduled. Therefore, the terminal device needs to skip the CC4, and first orchestrates HARQ-ACK information for a transport block in a time unit in the first piece of DCI on the CC6. After orchestrating the time unit in the first piece of DCI on the CC6, the terminal device orchestrates HARQ-ACK information for a transport block in a time unit scheduled by DCI on the CC4. Finally, the terminal device orchestrates HARQ-ACK information for a transport block in a time unit in the second piece of DCI on the CC6. Then, in six bits, a location filled with no HARQ-ACK bit is set to NACK. To be specific, a location (the $1^{st}$ bit) corresponding to a C-DAI in the DCI D(4,2) is a NACK because the DCI is not detected. Therefore, a location corresponding to a C-DAI (the location corresponding to the C-DAI is $Lj+V_{C-DAI,c,m}^{DL}-1=2$, where $V_{C-DAI,c,m}=2$, L=4, and j=0) is filled with no HARQ-ACK bit. Specific location information is shown in FIG. 7b.

In this manner, it may be understood that an "AND" operation is a default operation that is performed in a configuration in which feedback information is determined according to a dynamic codebook (for example, according to a DAI mechanism) and optionally, in a configuration of at least two carriers. This means that, for example, the "AND" operation is performed without requiring an additional signaling notification. To be specific, when the dynamic codebook is configured (for example, according to the DAI mechanism) to determine feedback information, and optionally, at least two carriers are configured, if one piece of DCI schedules a plurality of time units, the transmit end and the receive end both know to perform the "AND" operation to determine feedback information. Certainly, signaling may be additionally introduced to notify whether to enable the "AND" operation.

In this manner, similar to Manner 1, indication overheads of a C-DAI and a T-DAI in DCI can be reduced in a scenario of supporting a flexible quantity of aggregated/scheduled time units. In the foregoing examples, the C-DAI/T-DAI field requires only two bits; otherwise, the bit quantity of the C-DAI/T-DAI field should be at least greater than $\log_2(N)$, as described in Manner 3. In addition, feedback overheads can be further reduced, for example, feedback overheads can be reduced by three times. In a case of DCI loss, this manner can also avoid understanding inconsistency between a receive device and a transmit device (it is determined that one bit needs to be fed back regardless of the DCI lost on any carrier).

Manner 3

In this manner, the time unit aggregation information includes a quantity of time units scheduled by DCI or a time unit scheduled by DCI. The terminal device determines a bit quantity of feedback information based on T-DAI indication information. Different from Manner 1 in which N bits are fixedly fed back, in Manner 3, a quantity of time units scheduled by one piece of DCI is equal to the feedback bit quantity of feedback information.

If the quantity of time units scheduled by one piece of DCI is Y, where Y is an integer greater than or equal to 1; and the receive end device orchestrates, based on the C-DAI indication information, HARQ-ACK information for transport blocks in the Y time units scheduled by the DCI, to Y bits at a location corresponding to the C-DAI indication information. In other words, the Y bits at the location corresponding to the C-DAI indication information are the HARQ-ACK information for the transport blocks in the Y time units scheduled by the DCI.

A process of determining the location corresponding to the C-DAI indication information may be as follows.

A case with one code word or one TB configured and CBG feedback disabled is considered. It is assumed that $V_{C-DAI,c,m}$ is a value of a C-DAI in the DCI, and that the DCI is DCI that schedules a carrier c and that corresponds to data transmission in the $m^{th}$ time unit in a time window, or DCI that is borne in the $m^{th}$ time unit in a time window and that schedules a carrier c, or DCI that is borne on a carrier c in the $m^{th}$ time unit in a time window. Therefore, the corresponding location determined based on the C-DAI indication information is $Lj+V_{C-DAI,c,m}^{DL}-N_{c,m}$ or $Lj+V_{C-DAI,c,m}^{DL}$ (which depends on whether a quantity $N_{c,m}$ of time units scheduled by current DCI is included during DAI statistics collection, and if included, the location is a result of the former formula; otherwise, the location is a result of the latter formula), where $N_{c,m}$ represents the quantity of time units scheduled by the DCI, j represents j times of repetition of the C-DAI, and L depends on a bit quantity of the C-DAI field. For example, in LTE, in a case of two bits, the corresponding L is 4, or in a case of four bits, the corresponding L is 16 (counting for L times is a cycle).

A case with CBG feedback disabled and two TBs or two code words configured on at least one carrier or in at least one time unit (spatial bundling is disabled if spatial bundling needs to be considered, for example, in LTE, spatial-BundlingPUCCH is set to false or a control message sent by the terminal device to the base station does not exceed one threshold (for example, a capacity of the uplink control message)) is considered. It is assumed that $V_{C-DAI,c,m}$ is a value of a C-DAI in the DCI, and that the DCI is DCI that schedules a carrier c and that corresponds to data transmission in the m$^{th}$ time unit in a time window, or DCI that is borne in the m$^{th}$ time unit in a time window and that schedules a carrier c, or DCI that is borne on a carrier c in the m$^{th}$ time unit in a time window. Therefore, the corresponding location determined based on the C-DAI indication information is 2*(Lj+V$_{C-DAI,c,m}^{DL}$-N$_{c,m}$) or 2*(Lj+V$_{C-DAI,c,m}^{DL}$) (which depends on whether a quantity of currently scheduled time units is included during DAI statistics collection, and if included, the location is a result of the former formula; otherwise, the location is a result of the latter formula), where N$_{c,m}$ represents the quantity of time units scheduled by the DCI, j represents j times of repetition of the C-DAI, and L depends on a bit quantity of the C-DAI field. For example, in LTE, in a case of two bits, the corresponding L is 4, or in a case of four bits, the corresponding L is 16 (counting for L times is a cycle). In this application, a same bit quantity of the T-DAI field and a same bit quantity of the C-TDAI field may be configured for DCI that schedules all carriers, provided that the quantities are greater than log$_2$(the maximum quantity of time units). This can unify and simplify a design. Alternatively, the T-DAI field and the C-TDAI field in the DCI on each carrier may be related to the time unit aggregation information on the carrier, provided that both the values of the T-DAI field and the C-TDAI field are greater than log$_2$(Ni). In this way, DCI overheads can be reduced.

It should be noted that the foregoing formulas merely represent calculation results, and a specific calculation process may not be strictly performed according to the foregoing formulas. This is not limited in this application. During DAI statistics collection, a quantity of actually scheduled time units needs to be considered, and indicating a quantity of pieces of DCI or a quantity of PDCCHs (the C-DAI in the DCI increases by 1 each time) is not enough.

To more clearly describe a location, in feedback information, of HARQ-ACK information for a transport block in each time unit, the following details manners of orchestrating feedback information.

The terminal device orchestrates, in an order of carriers, HARQ-ACK information for a transport block in a time unit scheduled by DCI on each carrier in a first time unit. When a plurality of time units are scheduled by the DCI on a currently orchestrated carrier, HARQ-ACK information for transport blocks in the plurality of time units is first orchestrated, and the plurality of time units include a time unit following the first time unit. Then, HARQ-ACK information for a transport block in a time unit scheduled by the DCI on a subsequent carrier is orchestrated, the time unit scheduled by the DCI may include the first time unit, and the first time unit is a currently orchestrated time unit. After the HARQ-ACK information for the transport blocks in the time units scheduled by the DCI on all the carriers in the first time unit is orchestrated, HARQ-ACK information for a transport block in a time unit, scheduled by the DCI on each carrier, following the first time unit is orchestrated, where previously orchestrated HARQ-ACK information is skipped.

Figure 8A:
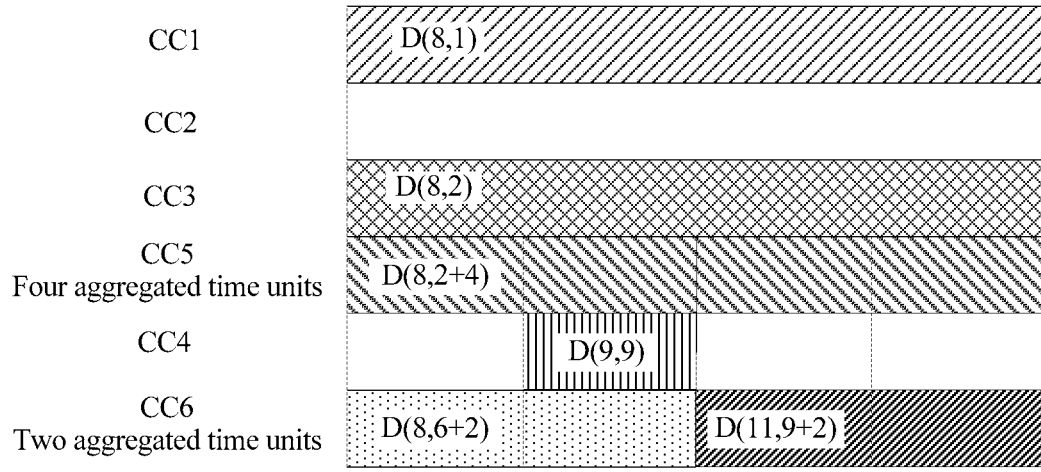
FIG. 8a is a schematic diagram of arrangement of time units according to this application.
Figure 8B:
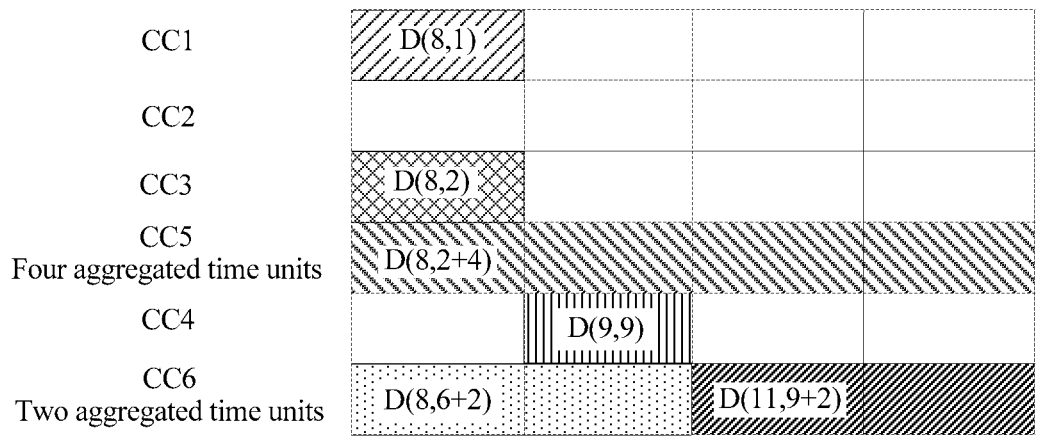
FIG. 8b is a schematic diagram of arrangement of time units according to this application.

For example, FIG. 8a and FIG. 8b show two schematic arrangement diagrams of time units scheduled by DCI on carriers. As shown in FIG. 8a, different time units are configured for a CC1, a CC2, a CC3, a CC4, a CC5, and a CC6. A same time unit is configured for all CCs shown in FIG. 8b. As shown in FIG. 8a or FIG. 8b, the receive device detects that a value of the last T-DAI is 11 in a time window, and therefore the receive device determines that the feedback bit quantity is 11.

In FIG. 8a or FIG. 8b, a time unit in the first column is a first time unit, that is, a currently orchestrated time unit.

Based on the C-DAI indication information, HARQ-ACK information for a transport block in a current time unit D(8,1) on the CC1 is first orchestrated, and the HARQ-ACK information is located in the 0$^{th}$ bit of feedback information (it is assumed that a quantity of time units scheduled by current DCI is included during DAI statistics collection, and a location corresponding to a C-DAI is Lj+V$_{C-DAI,c,m}^{DL}$-N$_{c,m}$=0, where V$_{C-DAI,c,m}$=1, N$_{c,m}$=1, L=16, and j=0). Because the DCI schedules only one time unit, the first bit starting from the 0$^{th}$ bit corresponds to the feedback information for the TB in the time unit scheduled by the DCI. Then, HARQ-ACK information for a transport block in a current time unit D(8,2) on the CC3 is orchestrated, and the HARQ-ACK information is located in the 1$^{st}$ bit of the feedback information (a location corresponding to a C-DAI is Lj+V$_{C-DAI,c,m}^{DL}$-N$_{c,m}$=1, where V$_{C-DAI,c,m}$=2, N$_{c,m}$=1, L=16, and j=0). Because the DCI schedules only one time unit, the first bit starting from the 1$^{st}$ bit corresponds to the feedback information for the TB in the time unit scheduled by the DCI. When the CC5 is orchestrated, DCI on the CC5 schedules four time units. After HARQ-ACK information for a transport block in a current time unit is orchestrated, HARQ-ACK information for transport blocks in three time units following the current time unit on the CC5 is continuously orchestrated, and then HARQ-ACK information for a transport block in a time unit in the first piece of DCI on the CC6 is orchestrated. Specifically, HARQ-ACK information for a transport block in a current time unit D(8,6) on the CC5 is orchestrated, and the HARQ-ACK information is located in the 2$^{nd}$ bit of the feedback information (a location corresponding to a C-DAI is Lj+V$_{C-DAI,c,m}^{DL}$-N$_{c,m}$=2, where V$_{C-DAI,c,m}$=6, N$_{c,m}$=4, L=16, and j=0). Because the DCI schedules four time units, four bits starting from the 2$^{nd}$ bit are feedback information for data in the four time units scheduled by the DCI. On the CC4, a time unit in the first column is not scheduled, but a time unit in the second column is scheduled. Therefore, the terminal device needs to skip the CC4, and first orchestrates HARQ-ACK information for a transport block in a time unit in the first piece of DCI on the CC6. After orchestrating the time unit in the first piece of DCI on the CC6, the terminal device orchestrates HARQ-ACK information for a transport block in a time unit scheduled by DCI on the CC4. Finally, the terminal device orchestrates HARQ-ACK information for a transport block in a time unit in the second piece of DCI on the CC6. Specific location information is shown in FIG. 9a.

In a case of DCI loss, a location corresponding to a C-DAI in the DCI is filled with no information (because the DCI and the C-DAI are lost), and the location filled with no feedback information may be filled with NACK or DTX.

For example, as shown in FIG. 8a or FIG. 8b, after DCI D(8,2) is lost, based on the C-DAI indication information, HARQ-ACK information for a transport block in a current time unit D(8,1) on the CC is first orchestrated, and the HARQ-ACK information is located in the 0$^{th}$ bit of feedback information (it is assumed that a quantity of time units scheduled by current DCI is included during DAI statistics collection, and a location corresponding to a C-DAI is Lj+V$_{C-DAI,c,m}^{DL}$-N$_{c,m}$=0, where V$_{C-DAI,c,m}$=1, N$_{c,m}$=1, L=16, and j=0). Because the DCI schedules only one time unit, the first bit starting from the 0$^{th}$ bit corresponds to the feedback information for the TB in the time unit scheduled by the DCI. When the CC5 is orchestrated, DCI on the CC5 schedules four time units. After HARQ-ACK information for a transport block in a current time unit is orchestrated, HARQ-ACK information for transport blocks in three time units following the current time unit on the CC5 is continuously orchestrated, and then HARQ-ACK information for a transport block in a time unit in the first piece of DCI on the CC6 is orchestrated. Specifically, HARQ-ACK information for a transport block in a current time unit D(8,6) on the CC5 is orchestrated, and the HARQ-ACK information is located in the $2^{nd}$ bit of the feedback information (a location corresponding to a C-DAI is $Lj+V_{C-DAI,c,m}^{DL}-N_{c,m}=2$, where $V_{C-DAI,c,m}=6$, $N_{c,m}=4$, $L=16$, and $j=0$). Because the DCI schedules four time units, four bits starting from the $2^{nd}$ bit are feedback information for data in the four time units scheduled by the DCI. On the CC4, a time unit in the first column is not scheduled, but a time unit in the second column is scheduled. Therefore, the terminal device needs to skip the CC4, and first orchestrates HARQ-ACK information for a transport block in a time unit in the first piece of DCI on the CC6. After orchestrating the time unit in the first piece of DCI on the CC6, the terminal device orchestrates HARQ-ACK information for a transport block in a time unit scheduled by DCI on the CC4. Finally, the terminal device orchestrates HARQ-ACK information for a transport block in a time unit in the second piece of DCI on the CC6. Then, in 11 bits, a location filled with no HARQ-ACK bit is set to NACK. To be specific, a location (the $1^{st}$ bit) corresponding to a C-DAI in the DCI D(8.2) is a NACK because the DCI is not detected. Therefore, a location corresponding to a C-DAI (the location corresponding to the C-DAI is $Lj+V_{C-DAI,c,m}^{DL}-N_{c,m}=1$, where $V_{C-DAI,c,m}=2$, $L=16$, $j=0$, and $N_{c,m}=1$) is filled with no HARQ-ACK bit. Specific location information is shown in FIG. 9b.

In this manner, a variable quantity of time units actually scheduled by DCI needs to be considered during DAI statistics collection. To avoid understanding inconsistency between the transmit end and the receive end, a bit quantity of the C-DAI/T-DAI field should be at least greater than $\log_2(N)$. For example, in the foregoing examples, it is assumed that the bit quantities of the C-DAI field and the T-DAI field are four bits, and therefore $L=16$. Otherwise, understanding inconsistency may be caused between the transmit end and the receive end. For example, it is assumed that the C-DAI includes two bits, that a maximum quantity of time units scheduled by one piece of DCI is 8, that a C-DAI in the first piece of DCI is 1 (00), and that a C-DAI in the second piece of DCI is 2 (01). Therefore, there are at least two possible cases: Case 1, only one time unit is scheduled by each of the two pieces of DCI, and no packet loss occurs. Case 2, the first piece of DCI schedules one packet, the second piece of DCI schedules one time unit, and one piece of DCI is lost, where the lost DCI schedules four time units. This manner can save unnecessary feedback overheads, for example, a default value does not need to be fed back in Manner 1.

Manner 4

In this manner, the time unit aggregation information includes whether time unit aggregation is configured (or whether time aggregation is enabled). Based on whether carriers are configured with time unit aggregation, carriers in a carrier group (for example, a PUCCH carrier group) are grouped into a carrier subset configured with time unit aggregation and a carrier subset configured without time unit aggregation. In other words, carriers configured with time unit aggregation are grouped into one subset, and carriers configured without time unit aggregation are grouped into another subset. Alternatively, the time unit aggregation information directly includes a carrier subset configured with time unit aggregation and/or a carrier subset configured without time unit aggregation.

For the carrier subset configured with time unit aggregation, the terminal device determines, based on a T-DAI corresponding to the carrier subset configured with time unit aggregation and a maximum quantity of time units configured for the carrier subset, a bit quantity of feedback information for the carrier subset configured with time unit aggregation; and determines one piece of feedback information. Methods for determining the bit quantity and the feedback information have been described in the foregoing manners (refer to any one of Manners 1 to 3 or other possible manners, and this is not limited in this application), and details are not described again.

For the carrier subset configured without time unit aggregation, the terminal device determines, based on a T-DAI corresponding to the carrier subset configured without time unit aggregation, a bit quantity of feedback information for the carrier subset configured without time unit aggregation; and determines one piece of feedback information. Methods for determining the bit quantity and the feedback information may be similar to those in an LTE system (refer to the determining manner in the example shown in Table 2 or other possible manners, and this is not limited in this application), and details are not described again.

The terminal device combines the feedback information for the carrier subset configured with time unit aggregation and the feedback information for the carrier subset configured without time unit aggregation, to obtain final feedback information.

Figure 5C:
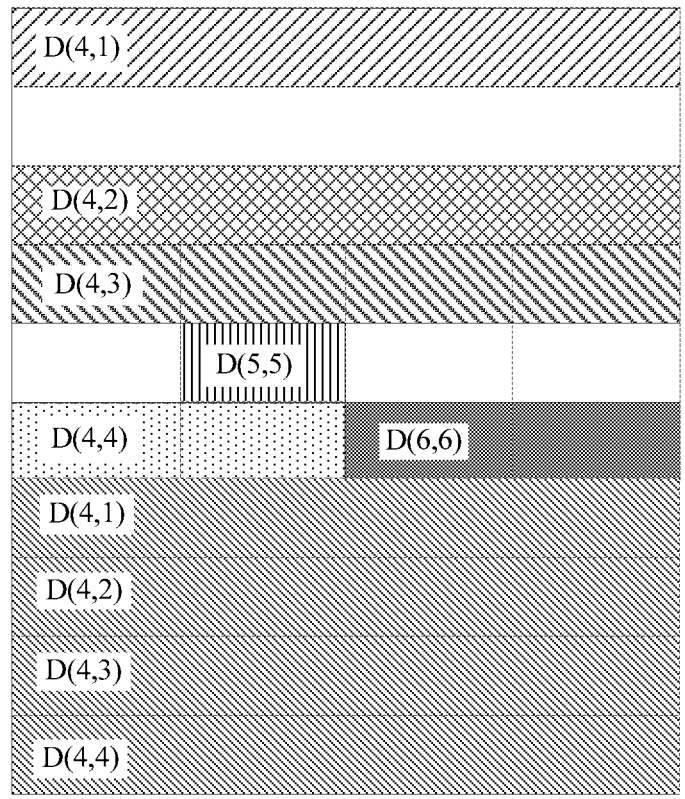
FIG. 5c is a schematic diagram of arrangement of time units according to this application.

For example, as shown in FIG. 5c, it is assumed that for a carrier 1 to a carrier 6, multi-time-unit aggregation is enabled and/or a configured quantity of time units scheduled by one piece of DCI is greater than 1, while for a carrier 7 to a carrier 10, multi-time-unit aggregation is disabled and/or a configured quantity of time units scheduled by one piece of DCI is equal to 1. Therefore, the CC1 to the CC6 are grouped into one subset. It is assumed that the feedback information for this subset, determined in Manner 1, includes 24 bits (for details, refer to Manner 1), or that the feedback information for this subset, determined in Manner 2, includes six bits (for details, refer to Manner 2), or that the feedback information for this subset, determined in Manner 3, includes 11 bits (for details, refer to Manner 3); or the bit quantity of the feedback information may be determined in another possible manner. In addition, the CC7 to the CC10 are grouped into another subset, and the feedback information determined in an LTE manner includes six bits (refer to the determining manner in the example shown in Table 2), or the bit quantity of the feedback information is determined in another possible manner. Then, the feedback information for the subset 1 and the feedback information for the subset 2 are cascaded to obtain final feedback information. The feedback information for the subset 1 may be placed before the feedback information for the subset 2, or the feedback information for the subset 1 may be placed after the feedback information for the subset 2.

In this manner, feedback information may be separately determined based on a status of time unit aggregation configured on each carrier, to save unnecessary DCI indication overheads and UCI feedback overheads.

It should be noted: 1. In this embodiment, only time unit aggregation information is discussed in subset grouping. In addition, other factors may also be considered, for example, whether CBG transmission/feedback is configured, and/or, whether numerology or time unit duration is configured. Specifically, a carrier "configured with CBG feedback and configured with time unit aggregation" may be determined into one subset, and a carrier "configured without CBG feedback and configured with time unit aggregation" may be determined into one subset, and a carrier "configured with CBG feedback and configured without time unit aggregation" may be determined into one subset; and a carrier "configured without CBG feedback and configured without time unit aggregation" may be determined into one subset. By way of example but not limitation, for the subset "configured with CBG feedback and configured with time unit aggregation", the bit quantity of the feedback information is determined based on a maximum quantity of time units and a maximum CBG quantity; for the subset "configured without CBG feedback and configured with time unit aggregation", the bit quantity of the feedback information is determined based on a maximum quantity of time units; and for the subset "configured with CBG feedback and configured without time unit aggregation", the bit quantity of feedback information is determined based on a maximum CBG quantity. 2. The subsets may be directly and implicitly determined based on the time unit aggregation information, and therefore no additional signaling overheads are required. Certainly, for the purpose of flexibility, the transmit device may notify the receive device of a subset division result through signaling, that is, which carriers are determined into one subset. Signaling in this specification may be radio resource control (RRC) signaling, a master information block (MIB) message, a system information block (SIB) message, radio resource control (RRC) signaling, media access control (MAC) control element (CE) signaling, or one or more types of physical layer signaling. Details are not described for brevity.

Manner 5

In this manner, the time unit aggregation information includes a quantity of aggregated time units configured for a carrier. The terminal device groups carriers in a carrier group (for example, a PUCCH carrier group) into Z subsets based on the quantity of aggregated time units configured for a carrier, where configured quantities of aggregated time units on all carriers in one subset are the same. For example, carriers each configured with four aggregated time units are grouped into one subset, carriers each configured with two aggregated time units are grouped into another subset, and carriers each configured with one aggregated time unit are grouped into still another subset.

For the $i^{th}$ subset of the Z subsets, the terminal device determines, based on a T-DAI for the $i^{th}$ subset and a quantity of time units configured for the $i^{th}$ subset, a bit quantity of feedback information for the $i^{th}$ subset, that is, determines that a product of the T-DAI for the $i^{th}$ subset and the quantity of time units configured for the $i^{th}$ subset is the bit quantity of the feedback information for the $i^{th}$ subset (refer to any one of Manners 1 to 4 described above or other possible manners different from those in this application). The terminal device orchestrates, based on C-DAI indication information in DCI in the $i^{th}$ subset, HARQ-ACK information for a transport block in a time unit scheduled by the DCI, to the feedback information for the $i^{th}$ subset (refer to any one of Manners 1 to 4 described above or other possible manners different from those in this application). In other words, a location corresponding to the C-DAI indication information in the feedback information for the $i^{th}$ subset corresponds to the HARQ-ACK information for the transport block in the time unit scheduled by the DCI in the $i^{th}$ subset, so as to obtain the feedback information for the $i^{th}$ subset. Finally, the terminal device combines feedback information for the Z subsets to obtain final feedback information. It should be noted that, a carrier or a subset that is configured without time unit aggregation or whose time unit aggregation is disabled may be understood as a carrier or a subset whose configured quantity of time units is 1.

Manner 6

In this manner, the time unit aggregation information includes whether time unit aggregation is configured, or whether a carrier is configured with or without time unit aggregation, and/or a quantity of aggregated time units configured for a carrier.

The receive end device determines, according to a dynamic codebook mechanism, feedback information for a carrier that is configured without time unit aggregation or whose configured quantity of aggregated time units is 1. In an implementation, the receive end device determines, based on the T-DAI indication information and the C-DAI indication information, the feedback information for the carrier that is configured without time unit aggregation or whose configured quantity of aggregated time units is 1. For details, refer to an LTE determining manner (for details, refer to the determining manner in the example shown in Table 2) or another possible manner.

The receive end device determines, according to a semi-persistent codebook mechanism, feedback information for a carrier that is configured with time unit aggregation and/or whose quantity of aggregated time units configured for a carrier is greater than 1 (one piece of feedback information may be determined for each carrier, and then the feedback information for all carriers is combined; or one piece of feedback information may be jointly determined). In an implementation, the receive end device determines, based on time window information and in a semi-persistent manner, the feedback information for the carrier that is configured with time unit aggregation and/or whose quantity of aggregated time units configured for a carrier is greater than 1. The time window information may be determined based on a configured HARQ time sequence K1 set. Specifically, a size of the semi-persistent codebook equals a size of the configured HARQ time sequence K1 set (or a time window size). It is assumed that a K1 set semi-persistently configured through RRC is {3,4,5,6}, and it may be determined that the time window size is also 4. In other words, a size of feedback information for one carrier that is configured with time unit aggregation and/or whose quantity of aggregated time units configured for a carrier is greater than 1 is four bits. During orchestration, optionally, the feedback information is orchestrated to a corresponding location in a chronological order. Determining feedback information in a semi-persistent manner (or referred to as a semi-persistent codebook mechanism) means that, the size of the determined feedback information does not depend on a quantity of pieces of actually scheduled/transmitted data. Specifically, a location corresponding to a time unit in which a PDSCH (where a decoding result for the PDSCH is borne in the feedback information) is transmitted in the time window is the decoding result for the corresponding PDSCH; and a location corresponding to a time unit in which no PDSCH is transmitted may be a default value, for example, a NACK or DTX. It should be noted that the foregoing manner is merely a possible semi-persistent manner of determining feedback information, and another semi-persistent codebook determining manner is also applicable to this application. For example, refer to other embodiments hereinafter or other possible manners different from those in this application.

Then, the receive end device combines the two parts of feedback information to obtain final feedback information.

It should be noted that the concept of the foregoing manner is also applicable to CBG transmission. To be specific, the receive end device determines, according to the dynamic codebook mechanism, feedback information for a carrier that is configured without CBG feedback or whose configured CBG quantity is 1. In an implementation, the receive end device determines, based on the T-DAI indication information and the C-DAI indication information, the feedback information for the carrier that is configured without CBG feedback or whose configured CBG quantity is 1. For details, refer to an LTE determining manner (for details, refer to the determining manner in the example shown in Table 2) or another possible manner.

The receive end device determines, according to the semi-persistent codebook mechanism, feedback information for a carrier that is configured with CBG feedback or whose configured CBG quantity is greater than 1. In an implementation, the receive end device determines, based on the time window size and a configured CBG quantity, the feedback information for the carrier that is configured with CBG feedback or whose configured CBG quantity is greater than 1.

This manner can also ensure understanding consistency between the transmit end and the receive end, support a flexible time unit aggregation configuration, and save unnecessary DCI overheads and UCI feedback overheads.

It should be noted that, in all the embodiments of this application, the time unit aggregation information may be borne through higher layer signaling (for example, RRC signaling or MAC CE), through physical layer signaling (for example (group) common DCI or UE-specific DCI), or through a combination of higher layer signaling and physical layer signaling (for example, one set is configured through RRC signaling, and a specific value or whether to enable/disable is indicated through DCI).

In another possible manner of this manner, signaling for configuring CBG feedback/transmission and signaling for configuring time unit aggregation information are not the same one. Therefore, a carrier may be configured with both CBG feedback/transmission and time unit aggregation information. In this case, all the configuration signaling can be valid.

(1) In Manner 1, L bits (L is a configured maximum CBG quantity) are fed back for all TBs, that is, a feedback bit quantity is determined by T-DAI*N*L. An orchestration manner is similar. L bits for TBs scheduled by one piece of DCI may be sequentially arranged to locations corresponding to a C-DAI or alternately arranged to locations corresponding to a C-DAI. In other words, the L bits at the locations corresponding to the C-DAI are sequentially arranged as the TBs scheduled by the one piece of DCI, and the L bits at the locations corresponding to the C-DAI are alternately arranged as the TBs scheduled by the one piece of DCI. Certainly, feedback information of the maximum CBG quantity does not need to be fed back for every TB. This may be similar to Manner 3, that is, a quantity of scheduled CBGs is equal to a bit quantity of feedback information that needs to be fed back. However, in this case, the bit quantity of the C-DAI/T-DAI field should be at least greater than $\log_2(NL)$.

(2) In Manner 2, L bits are fed back for a code word scheduled by each piece of DCI. To be specific, an AND operation is performed on feedback information for all CBGs in a plurality of time units to generate one-bit feedback information. For example, the DCI schedules one code word, which corresponds to X time units, and therefore one bit is generated by performing an AND operation on feedback information for the first CBG in the X time units, one bit is generated by performing an AND operation on feedback information for the second CBG in the X time units, and by analogy, L bits are generated. Alternatively, N bits are fed back for a code word scheduled by each piece of DCI. To be specific, one bit is generated by performing an AND operation on feedback information for a plurality of CBGs in each of a plurality of time units. For example, the DCI schedules one code word, which corresponds to X time units, and therefore one bit is generated by performing an AND operation on feedback information for a plurality of CBGs in the $1^{st}$ time unit of the X time units, one bit is generated by performing an AND operation on feedback information for a plurality of CBGs in the $2^{nd}$ time unit of the X time units, and by analogy, N bits are generated.

(3) In Manner 3, L bits (L is a configured maximum CBG quantity) are fed back for all TBs, that is, a feedback bit quantity is determined by T-DAI*L. An orchestration manner is similar. L bits for TBs scheduled by one piece of DCI may be sequentially arranged to locations corresponding to a C-DAI or alternately arranged to locations corresponding to a C-DAI. In other words, the L bits at the locations corresponding to the C-DAI are sequentially arranged as the TBs scheduled by the one piece of DCI, and the L bits at the locations corresponding to the C-DAI are alternately arranged as the TBs scheduled by the one piece of DCI.

Excessively high UCI or DCI overheads may be avoided in the following manners. 1. If a quantity of aggregated time units is set to be greater than 1 (or time unit aggregation is enabled), TB-level feedback is used by default, instead of using/enabling CBG feedback/transmission, although signaling is used to configure the CBG feedback/transmission. In this manner, it may be understood that time unit aggregation has a higher priority than CBG feedback/transmission. 2. If CBG transmission is configured, a quantity of aggregated time units is set to 1 by default (or time unit aggregation is disabled), although signaling is used to configure the quantity of aggregated time units to be greater than 1 (or time unit aggregation is enabled). In this manner, it may be understood that time unit aggregation has a lower priority than CBG feedback/transmission.

In a case of CBG transmission configured, if one piece of DCI schedules a plurality of time units, the DCI may include the following content:

1. One CBG indication (a bit quantity depends on a quantity of CBG configured through RRC signaling). The one CBG indication is used to indicate which CBG transmission is scheduled. A plurality of time units scheduled by the DCI share one CBG indication. For example, a four-bit CBG indication is 1101. This means that the $1^{st}$ time unit schedules a CBG1, a CBG2, and a CBG4; the $2^{nd}$ time unit schedules the CBG1, the CBG2, and the CBG4; and by analogy, the $X^{th}$ time unit schedules the CBG1, the CBG2, and the CBG4. Certainly, the DCI may include two CBG indications, which correspond to indications of two code words. DCI overheads can be lower than those in a case of X or N CBG indications.

2. One flush indication (for example, one bit). The one flush indication is used to indicate that a currently scheduled CBG or data buffer requires special processing (for example, receiving a data buffer before flushing and/or not participating in HARQ combination). A plurality of time units scheduled by the DCI share one flush indication indication. For example, a one-bit flush indication is 1. This means that a CBG/data buffer scheduled by the $1^{st}$ time unit is flushed and does not participate in HARQ combination, a CBG/data buffer scheduled by the $2^{nd}$ time unit is flushed and does not participate in HARQ combination, and by analogy, a CBG/data buffer scheduled by the $X^{th}$ time unit is flushed and does not participate in HARQ combination. Certainly, the DCI may include two flush indications, which correspond to indications of two code words, or the DCI still includes one flush indication (for example, one bit), and the one flush indication is used to indicate processing of two code words. DCI overheads can be lower than those in a case of X or N CBG indications.

Step 203: The terminal device sends the feedback information for the at least one transport block.

According to the foregoing embodiment, the terminal device obtains the time unit aggregation information and the DAI indication information that are sent by the base station, determines the feedback information for the at least one transport block based on the time unit aggregation information and the DAI indication information, and finally sends the feedback information for the at least one transport block to the base station. This can improve a manner of determining HARQ feedback information in an NR system, so as to support a scenario with a flexible quantity of aggregated/scheduled time units, thereby avoiding understanding inconsistency and disorder of the HARQ feedback information between the terminal device and the base station on a premise of ensuring downlink control overheads and uplink feedback overheads.

Based on the same technical concept, the following further provides other embodiments to describe the procedure of determining feedback information in this application.

Embodiment 2

Because a base station may further configure, for a terminal device, one or more bandwidth parts (BWPs) on one carrier, each BWP corresponds to one type of numerology, for example, a subcarrier spacing, a cyclic prefix (CP), or another parameter. Therefore, in a possible implementation of this application, feedback information may be determined based on BWPs that are configured or activated or that can be simultaneously activated on the carrier.

Specifically, there may be two manners: a dynamic codebook manner and a semi-persistent codebook manner.

Figure 10:
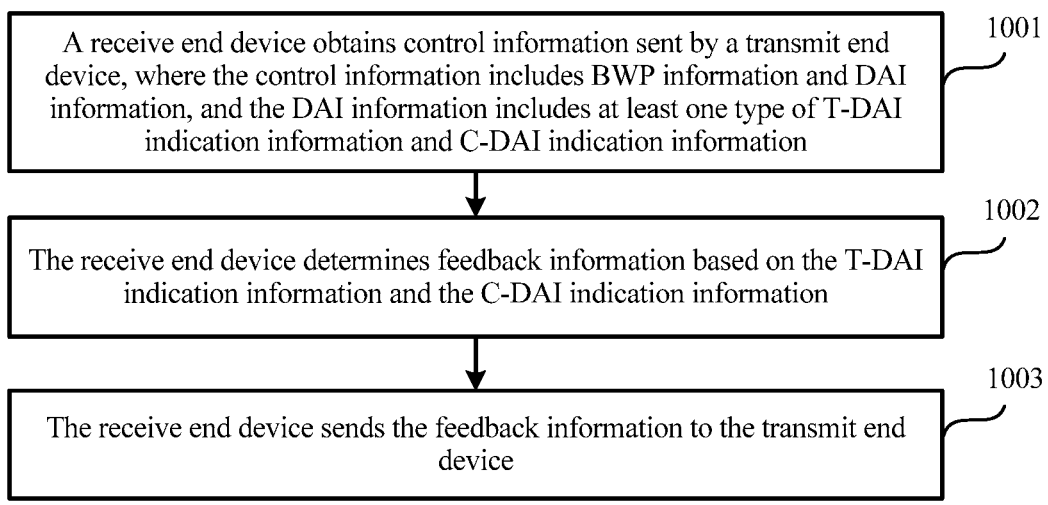
FIG. 10 is a schematic flowchart of determining feedback information according to this application.

For the dynamic codebook manner, refer to a procedure shown in FIG. 10. The procedure may specifically include the following steps.

Step 1001: A receive end device obtains control information sent by a transmit end device, where the control information includes BWP information and DAI information, and the DAI information includes at least one type of T-DAI indication information and C-DAI indication information.

In a possible implementation of this application, the control information may include the BWP information (for example, BWPs that are configured or activated or that can be simultaneously activated, or activation/deactivation signaling for the BWP and/or BWP configuration information). Second control information may include the T-DAI indication information and the C-DAI indication information. For definitions of a T-DAI and a C-DAI, refer to the foregoing descriptions. A difference lies in that the T-DAI/C-DAI is counted in the following order: CCs, BWPs, and time units. For example, refer to Table 4.

TABLE 4

| | | | |
|---|---|---|---|
| CC1, BWP1 | | D(4, 1) | |
| CC2, BWP1 | | | |
| CC2, BWP2 | | D(4, 2) | |
| CC2, BWP3 | D(4, 3) | | |

TABLE 4-continued

| | | | |
|---|---|---|---|
| CC3, BWP1 | | D(5, 5) | |
| CC3, BWP2 | D(4, 4) | | D(6, 6) |

Step 1002: The receive end device determines feedback information based on the T-DAI indication information and the C-DAI indication information.

In the process of determining the feedback information, time unit aggregation information may be considered. For details, refer to Manners 1 to 6. If no time unit aggregation is configured, refer to the descriptions of the determining manner in the example shown in Table 2. Details are not described herein again.

Step 1003: The receive end device sends the feedback information to the transmit end device.

In the semi-persistent codebook manner, the BWP aggregation information may be a quantity of BWPs that are configured or activated or that can be simultaneously activated on the carrier. The terminal determines a bit quantity of the feedback information based on the BWP aggregation information and a time window size.

For example, it is assumed that there are three carriers, a quantity of BWPs on a first carrier is 2, a quantity of BWPs on a second carrier is 1, and a quantity of BWPs on a third carrier is 3. The time window size is 2. Therefore, the feedback bit quantity is (2+1+3)*2=12 bits. An arrangement order of feedback information for all carriers may be as follows:

Arrangement manner 1: Feedback information for all carriers is sequentially arranged, as shown in FIG. 11.

Arrangement manner 2: Feedback information for all BWPs is sequentially arranged, as shown in FIG. 12.

Arrangement manner 3: Feedback information is arranged first in frequency domain and then in time domain, as shown in FIG. 13.

Embodiment 3

In this embodiment, feedback information is determined based on time window information and time unit format information (slot format information, SFI). In an implementation, the time window information may be determined based on a set of configured possible values of K1, and the SFI is borne in higher layer signaling (for example, RRC signaling) and/or physical layer signaling (for example, group common DCI).

In an NR system, to support flexible and dynamic TDD, a DL/UL transmission direction of each time unit (a slot, a symbol, and the like) may be configured through higher layer signaling and/or physical layer group common DCI. In a possible implementation, one period is configured, for example, a time duration for the period is 5 ms or 10 ms. Within this period, some fixed resources/time units may be configured for UL transmission, other fixed resources/time units may be configured for DL transmission, and some reserved resources may be configured; and the remaining resources/time units within the period may be flexibly and dynamically designated as DL or UL or reserved/blank resources.

Figures 14, 15, 16:
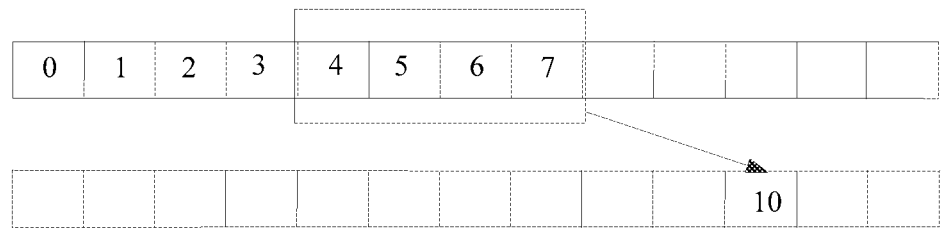
FIG. 14 is a schematic diagram of arrangement of time units according to this application.
FIG. 15 is a schematic diagram of arrangement of time units according to this application.
FIG. 16 is a schematic diagram of arrangement of time units according to this application.

For example, as shown in FIG. 14, time units 0 to 2 are fixedly used for DL transmission, time units 7 to 9 are fixedly used for UL transmission, and time units 3 to 6 may be flexibly and dynamically designated as DL or UL or reserved/blank resources. The period includes 10 time units. FIG. 14 clearly shows that the time units fixedly configured for UL should not be present in a time window or feedback information. Therefore, when the terminal device determines the feedback information based on the time window configured by a base station, a DL/UL transmission direction for a time unit further needs to be considered, thereby avoiding unnecessary feedback overheads.

It is assumed that a K1 set semi-persistently configured through RRC is {3,4,5,6}. A TB that is possibly fed back in an uplink time unit #7 comes from a downlink time unit #1 (n+6), a downlink time unit #2 (n+5), a downlink time unit #3 (n+4), and a downlink time unit #4 (n+3). Therefore, the time window includes the time units #1 to #4, and it may be determined that a bit quantity of feedback information is four bits. A TB that is possibly fed back in an uplink time unit #9 comes from a downlink time unit #3 (n+6), a downlink time unit #4 (n+5), a downlink time unit #5 (n+4), and a downlink time unit #6 (n+3). Therefore, the time window includes the time units #3 to #6, and it may be determined that a bit quantity of feedback information is four bits. It should be noted that, if K1 indication information in DCI that schedules a PDSCH transmitted in a specific time unit is not fed back in the time unit #7, a corresponding bit may be optionally set to NACK or DTX. For example, it is assumed that K1 indication information in DCI that schedules a PDSCH in the time unit #2 is not 5 (not fed back in the time unit #7), and a corresponding bit may be optionally set to NACK or DTX in the feedback information.

If the time unit #3 is fixedly configured for uplink transmission, feedback information fed back in the uplink time unit #7 does not need to include the time unit #3, and correspondingly the terminal device may determine that the bit quantity of the feedback information is three bits. Feedback information fed back in the uplink time unit #9 does not need to include the time unit #3, and correspondingly the terminal device may determine that the bit quantity of the feedback information is three bits. In other words, in the process of determining the bit quantity of the feedback information, whether a time unit in the time window is configured for uplink transmission or downlink transmission needs to be detected. If uplink transmission is included (which may be fixed uplink transmission semi-persistently configured through higher layer signaling and/or uplink transmission dynamically indicated by physical layer signaling), the uplink transmission (which may be fixed uplink transmission semi-persistently configured through higher layer signaling and/or uplink transmission dynamically indicated by physical layer signaling) needs to be excluded, and only feedback information for a transport block in a corresponding time unit configured for downlink transmission needs to be fed back. In this manner, a feedback corresponding to an uplink transmission time unit is excluded, thereby saving unnecessary feedback overheads.

In the foregoing example, only the uplink transmission time unit is considered. Similarly optionally, a feedback corresponding to a reserved/blank time unit may be further excluded.

In the foregoing example, the time window is determined by the configured set of possible values of K1. In addition, the time window may be directly configured through signaling. In an implementation, RRC configuration signaling may be used to configure a time window size and/or a minimum value of K1; a distance between the last time unit in the time window and a time unit of a PUCCH/PUSCH bearing the feedback information and/or a maximum value of K1; and a distance between the $1^{st}$ time unit in the time window and a time unit of a PUCCH/PUSCH bearing the feedback information. In this manner, the time window can be flexibly managed/configured.

As shown in FIG. 15, a time window size is set to 4, a minimum value of a time window K1 is set to 2, and therefore a codebook size fed back in a time unit 10 is 4, which corresponds to transmission in time units 4 to 7. The foregoing configuration may be configured for each time unit and/or may be configured for each carrier, or only one configuration (all time units and all carriers share the one configuration) may be configured for UE.

In addition, other manners of determining a time window are also applicable, and this is not limited in this application.

Embodiment 4

In a possible implementation, in 5G, a period of a control channel resource or a PDCCH for DCI that schedules a PDSCH of each carrier is configurable. Therefore, a monitoring period may be considered as follows: For example, monitoring is performed once at intervals of one time-domain symbol or a plurality of time-domain symbols or at intervals of one time unit or a plurality of time units. It is assumed that a same quantity of symbols or time units is configured, if a subcarrier spacing configuration or a numerology configuration is different, periods may also be considered to be different.

To simplify a design of a DAI borne in DCI (for example, to make counting simpler, or otherwise time misalignment and complex counting may be caused), in the foregoing process of grouping carrier subsets, a terminal device may further obtain subsets through grouping based on the monitoring period of the control channel or the control channel resource. Specifically, the terminal device groups carriers into M subsets based on the monitoring period of the control channel or the control channel resource, and monitoring periods of control channels or control channel resources of carriers in one subset are the same. For example, some carriers are grouped into a subset 1, and a monitoring period of a control channel or a control channel resource or a control resource set (CORESET) bearing DCI that schedules a PDSCH on the carrier is 1; and some carriers are grouped into a subset 2, and a monitoring period of a control channel or a control channel resource or a CORESET bearing DCI that schedules a PDSCH on the carrier is 2.

For the $i^{th}$ subset of the M subsets, the terminal device may determine one piece of feedback information based on the foregoing embodiments or other possible embodiments different from those in this application, and then the terminal device combines feedback information for the M subsets to obtain final feedback information. Details are not described.

Embodiment 5

In a possible implementation, in a manner of collecting statistics of a T-DAI and a C-DAI based on subsets (for example, as described in the foregoing embodiments) or carriers, if DCI on a specific carrier is lost, understanding inconsistency may be caused between a base station and a terminal device, causing poor robustness of a system. As shown in FIG. 16, if DCI D(3,3) is lost, the last received T-DAI is 2 for a first subset, and the last received T-DAI is 7 for a second subset. In a case with only one code word configured and CBG unconfigured, the UE feeds back nine (2+7) bits. However, the base station requires the terminal device to feed back 10 (3+7) bits. Consequently, understanding inconsistency is caused between the base station and the terminal device, and the base station cannot receive HARQ information fed back by the terminal device.

Figure 17:
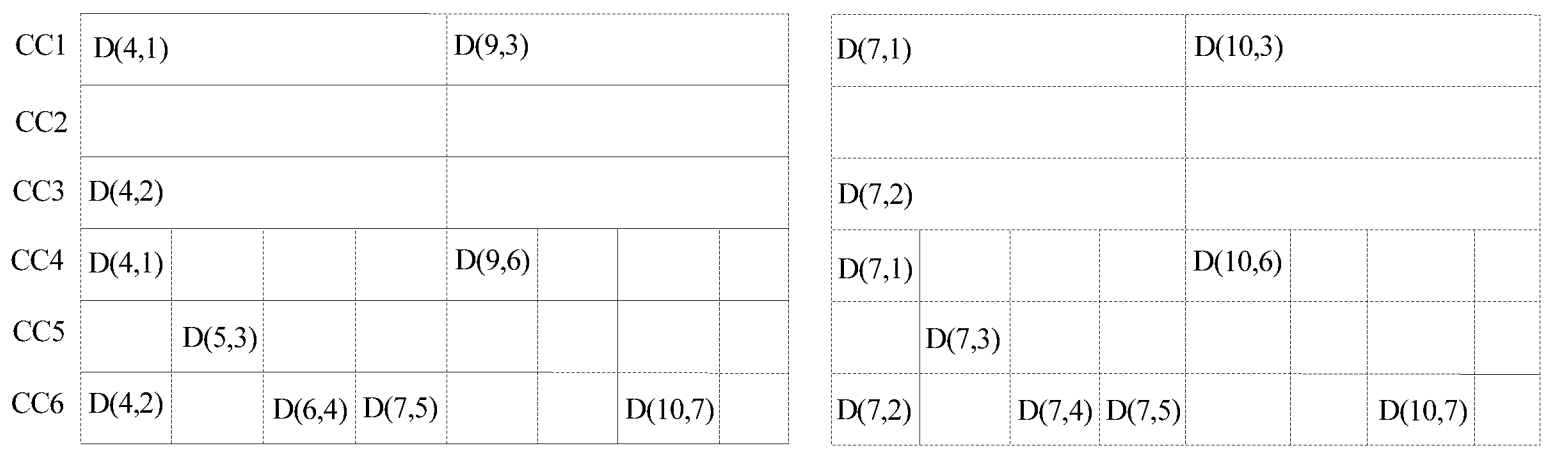

In view of this, this embodiment provides a manner of carrier-group-based T-DAI statistics collection and subset-based C-DAI statistics collection. Refer to FIG. 17 (the left diagram of FIG. 17 shows that the T-DAI indicates a total quantity of scheduled PDSCHs counted in a current shortest time unit; and the right diagram of FIG. 17 shows that the T-DAI indicates a total quantity of scheduled PDSCHs within a current longest time unit). The T-DAI is specific to statistics collection of all six carriers in a carrier group (for example, a PUCCH carrier group). For a physical meaning, refer to the foregoing descriptions. The C-DAI is specific to statistics collection of carriers included in a subset in a carrier group (for example, a PUCCH carrier group). For a physical meaning, refer to the foregoing descriptions.

As shown in FIG. 17, statistics show that a total T-DAI of all scheduled subsets in a carrier group is 10, where a C-DAI for a first subset is 3, and a C-DAI for a second subset is 7. In a case with one code word configured and CBG feedback unconfigured, the terminal device knows that 10-bit feedback information needs to be generated, where three bits thereof are placed as feedback information for the first subset, and seven bits thereof are placed as feedback information for the second subset.

In addition, in this application, it is assumed that there are N subsets, and feedback information for first (N−1) subsets is sequentially cascaded and is orchestrated in order starting from the first bit of total feedback information, while feedback information for the $N^{th}$ subset is orchestrated in reverse order starting from the last bit of the total feedback information. As shown in Table 5, three bits of the first subset are sequentially orchestrated to first three bits of the total feedback information (10 bits) (HARQ-ACK information for a TB corresponding to D(4,1) is the $1^{st}$ bit, HARQ-ACK information for a TB corresponding to D(4,2) is the $2^{nd}$ bit, and so on). The seven bits of the second subset are orchestrated to the end of the total feedback information in reverse order (HARQ-ACK information for a TB corresponding to D(4,1) is the $10^{th}$ bit, HARQ-ACK information for a TB corresponding to D(4,2) is the $9^{th}$ bit, and so on).

TABLE 5

| A/N D(4, 1) | A/N D(4, 2) | A/N D(9, 3) | A/N D(10, 7) | A/N D(9, 6) | A/N D(7, 5) | A/N D(6, 4) | A/N D(5, 3) | A/N D(4, 2) | A/N D(4, 1) |
|---|---|---|---|---|---|---|---|---|---|

Alternatively, as shown in Table 6, three bits of the first subset are sequentially orchestrated to first three bits of the total feedback information (10 bits) (HARQ-ACK information for a TB corresponding to D(7,1) is the $1^{st}$ bit, HARQ-ACK information for a TB corresponding to D(7,2) is the $2^{nd}$ bit, and so on). The seven bits of the second subset are orchestrated to the end of the total feedback information in reverse order (HARQ-ACK information for a TB corresponding to D(7,1) is the $10^{th}$ bit, HARQ-ACK information for a TB corresponding to D(7,2) is the $9^{th}$ bit, and so on).

TABLE 6

| A/N D(7, 1) | A/N D(7, 2) | A/N D(10, 3) | A/N D(10, 7) | A/N D(10, 6) | A/N D(7, 5) | A/N D(7, 4) | A/N D(7, 3) | A/N D(7, 2) | A/N D(7, 1) |
|---|---|---|---|---|---|---|---|---|---|

It should be noted that, feedback information for the first subset may be alternatively orchestrated in order starting from the $1^{st}$ bit of the total feedback information, and feedback information for last (N−1) subsets is orchestrated in reverse order starting from the last bit of the total feedback information. This embodiment is merely an example, and an orchestration order of feedback information for each subset is not limited.

Therefore, in FIG. 17, it is assumed that DCI D(9,3) is lost, the terminal device still generates 10-bit feedback information, and the base station can correctly extract 10-bit feedback information from the 10-bit feedback information fed back by the terminal device. However, in the prior art, only nine bits are generated, incorrect mapping occurs from the $3^{rd}$ bit. The $3^{rd}$ bit should correspond to HARQ-ACK information for the last one TB of the first subset. However, the $3^{rd}$ bit fed back by the terminal device is HARQ-ACK information for the first TB of the second subset. Therefore, this embodiment can enhance robustness of the feedback information.

Similarly, in this embodiment, a manner of carrier-group-based C-DAI statistics collection and subset-based T-DAI statistics collection may be alternatively used, and details are not described.

Embodiment 6

Feedback information is determined based on numerology (or time unit duration) of each carrier or BWP and based on a time window size. Specifically, if HARQ feedback information on a first carrier is borne on an uplink control channel on a second carrier for transmission, a size of the HARQ feedback information on the first carrier is the time window size (for example, a quantity of values in an RRC-configured time window K1 set)*N, where N=Time unit duration of the second carrier/Time unit duration of the first carrier (or N=Subcarrier spacing of the first carrier/Subcarrier spacing of the second carrier, or time units of N first carriers are aligned with a time unit of one second carrier).

Figure 18:
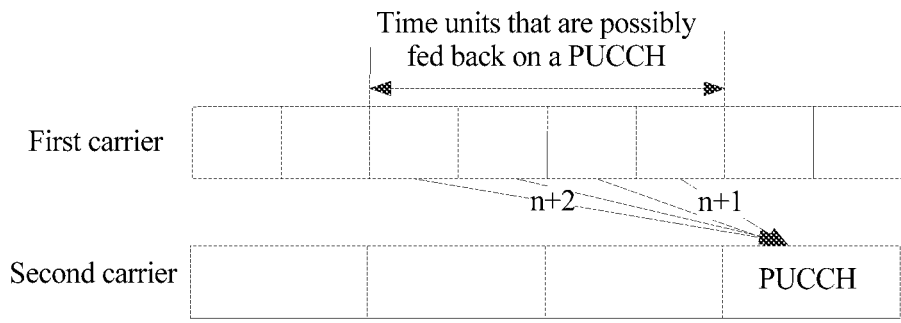
FIG. 18 is a schematic diagram of arrangement of time units according to this application.

For example, if an RRC-configured K1 set is {1,2}, a size of the RRC-configured time window K1 set is 2. As shown in FIG. 18, Time unit duration of a second carrier/Time unit duration of a first carrier=2 (or Subcarrier spacing of the first carrier/Subcarrier spacing of the second carrier=2, or time units of two first carriers are aligned with a time unit of one second carrier), and therefore, a size of HARQ feedback information for the first carrier is 2*2=4.

Figure 19:
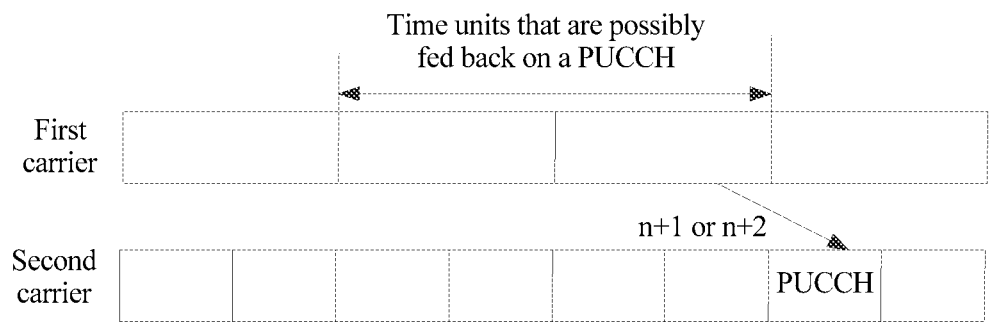
FIG. 19 is a schematic diagram of arrangement of time units according to this application.

As shown in FIG. 19, Time unit duration of a second carrier/Time unit duration of a first carrier=½ (or Subcarrier spacing of the first carrier/Subcarrier spacing of the second carrier=½, or a time unit of one first carrier is aligned with time units of two second carriers), and therefore, a size of HARQ feedback information for the first carrier is 2*½=1.

It should be noted that if N<1, the result may be obtained through round up.

If time unit aggregation is considered, after one TB is mapped into a plurality of aggregated time units, it may be understood that time unit duration increases, in other words, Time unit duration=Duration of one time unit*Quantity of time units.

Certainly, with reference to the foregoing embodiments, a quantity of fixed uplink time units on the carrier in a time window may be further excluded.

Another possible implementation is as follows:

Feedback information is determined based on a DAI, K2, and a time window. K2 represents a time relationship between a time unit for transmitting a PDCCH and a time unit for transmitting a PUSCH, where the PDCCH is used for scheduling the PUSCH. Specifically, if scheduling information is sent on the PDCCH in the $n^{th}$ time unit, correspondingly, a time unit used by the PUSCH is the $(n+K2)^{th}$ time unit.

For a semi-persistent codebook, a codebook size is the time window size. For example, the time window size is M time units, and in a case of one carrier, a single code word configured, and a CBG unconfigured, the size of the semi-persistent codebook is M bits (not depending on a quantity of actually scheduled PDSCHs). To save feedback overheads, there may be DCI that schedules a PUSCH in the last time unit in the time window, where the DCI may carry a DAI indication, to indicate the quantity of actually scheduled PDSCHs in the time window. Therefore, the codebook size fed back by UE may be less than M, and the feedback information may be borne on the scheduled PUSCH to be fed back to the base station. In LTE, an interval between a time unit for scheduling DCI and a time unit for transmitting a PUSCH is fixed (for example, 4). In addition, the interval equals an interval between a time unit of the last PDSCH time unit and a time unit for feeding back HARQ-ACK for the last PDSCH. Therefore, a time unit of DCI that schedules a PUSCH bearing a HARQ-ACK is definitely the last time unit in the time window.

Figure 20:
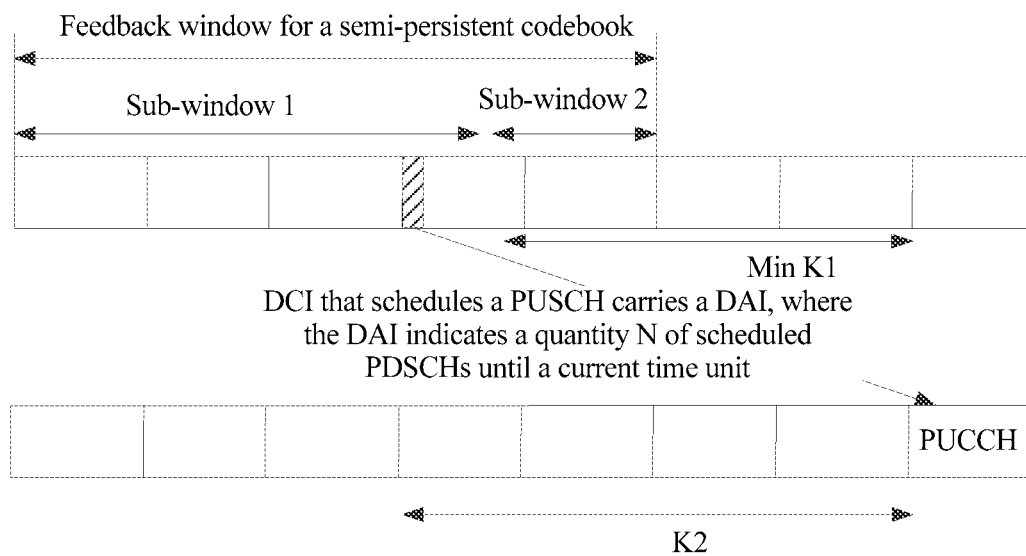
FIG. 20 is a schematic diagram of arrangement of time units according to this application.

Due to introduction of a flexible time sequence, to be specific, an interval between a time unit for scheduling the DCI and a time unit for transmitting a PUSCH is K2, which is flexible and variable (for example, for K0 and K1 as described in background, a set of possible values are first configured through RRC signaling, and then specific value information is notified by using DCI). Therefore, the time unit of the DCI that schedules the PUSCH bearing the HARQ-ACK is not necessary the last time unit in the time window. As shown in FIG. 20, in this case, the DAI of the time unit of the DCI that schedules the PUSCH bearing the HARQ-ACK indicates a quantity of scheduled PDSCHs/time units that end at a current location. Therefore, the codebook size should be determined by DAI+X, where the DAI is the quantity of scheduled PDSCHs/time units that end at the current location, and X is a size of a sub-window 2 in FIG. 20 or a quantity of remaining time units in the time window (which is related to K2, and may be understood that Quantity of remaining time units=Value of K2−Configured minimal value of K1).

Such a manner can support a flexible K2 time sequence, thereby avoiding unnecessary feedback overheads.

It may be understood that, some technical descriptions, technical hypotheses, and technical terms in the foregoing embodiments may be shared by all the foregoing embodiments, and technical solutions may also be combined, unless otherwise specified or the logic does not make sense. Details are not described.

Figure 21:
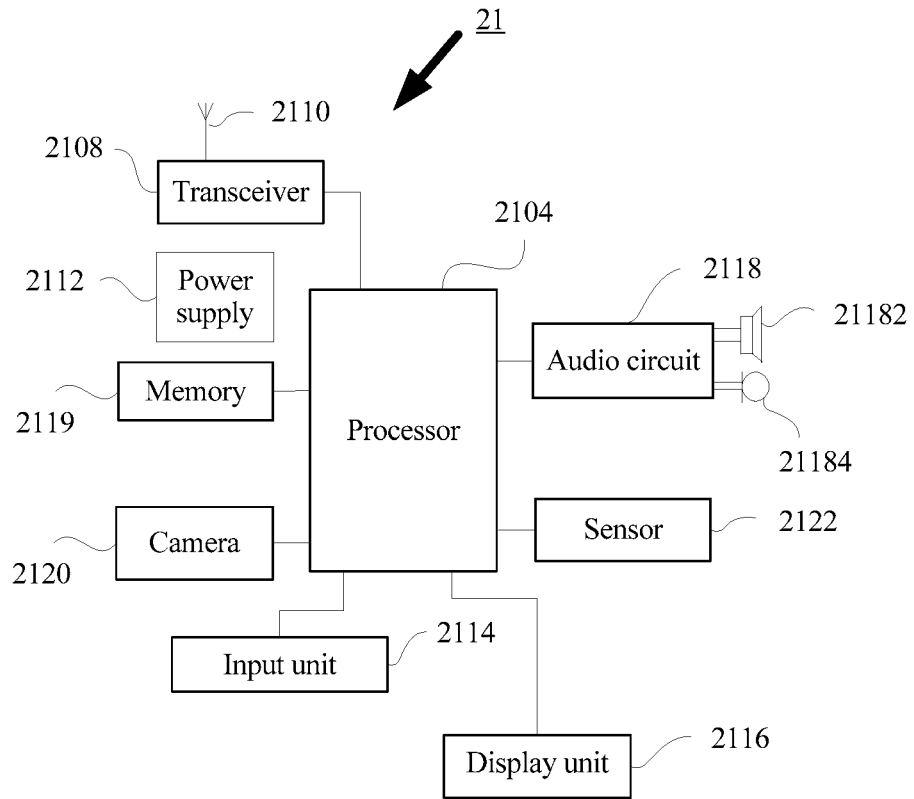
FIG. 21 is a schematic structural diagram of a terminal device according to this application.

Based on a same technical concept, an embodiment of this application further provides a terminal device. For a location of the terminal device in a communications system, refer to the terminal device shown in FIG. 1 The terminal device may be a mobile phone, a tablet computer, a computer with a wireless transmission/reception function, a virtual reality terminal device, an augmented reality terminal device, a wireless terminal in industrial control, a wireless terminal in self-driving, a wireless terminal in telemedicine, a wireless terminal in a smart grid, a wireless terminal in transportation safety, a wireless terminal in a smart city, a wireless terminal in a smart home, or the like Specifically, FIG. 21 shows a terminal device 21 according to an embodiment of this application. The terminal device 21 includes a transceiver 2108 and a processor 2104.

The terminal device 21 may further include a memory 2119, and the memory 2119 stores a computer-executable instruction.

The transceiver 2108 is configured to: obtain control information sent by a transmit end device, where the control information includes time unit aggregation information and downlink assignment index DAI indication information, and the DAI information includes at least one type of total downlink assignment index T-DAI indication information and counter downlink assignment index C-DAI indication information; and send the feedback information to the transmit end device;

the processor 2104 is configured to determine feedback information for at least one transport block based on the time unit aggregation information and the DAI indication information that are obtained by the transceiver 2108; and the transceiver 2108 is further configured to send the feedback information for the at least one transport block to the transmit end device.

Further, the time unit aggregation information includes a maximum quantity of time units that can be scheduled by one piece of downlink control information DCI; and when the processor 2104 determines the feedback information for the at least one transport block based on the time unit aggregation information and the DAI indication information that are obtained by the transceiver 2108, the processor 2104 is specifically configured to:

determine a bit quantity of the feedback information for the at least one transport block based on the T-DAI indication information and the maximum quantity of time units that can be scheduled by one piece of DCI; and orchestrate, based on the C-DAI indication information, feedback information for a transport block in a time unit scheduled by the DCI, to a location corresponding to the C-DAI indication information.

Further, the time unit aggregation information includes a quantity of time units scheduled by the DCI; and when the processor 2104 determines the feedback information for the at least one transport block based on the time unit aggregation information and the DAI indication information that are obtained by the transceiver 2108, the processor 2104 is specifically configured to:

when a plurality of time units are scheduled by one piece of DCI, perform an AND operation on feedback information for transport blocks in the plurality of time units to generate one-bit feedback information, and orchestrate the one-bit feedback information to a location corresponding to a C-DAI in the DCI; and determine the bit quantity of the feedback information for the at least one transport block based on the T-DAI indication information.

The processor 2104 may be configured to execute actions internally implemented by the terminal device described in the foregoing method embodiments, and the transceiver 2108 may be configured to execute a transmission or sending action from the terminal device to a base station described in the foregoing method embodiments. For details, refer to the descriptions in the foregoing method embodiments. Details are not described herein again.

The processor 2104 and the memory 2119 may be integrated into one processing apparatus. The processor 2104 is configured to execute program code stored in the memory 2119 to implement the foregoing functions. During specific implementation, the memory 2119 may be alternatively integrated into the processor 2104.

The terminal device may further include a power supply 2112, configured to supply power to various components or circuits of the terminal device. The terminal device may include an antenna 2110, configured to send, through a radio signal, uplink data or uplink control signaling that is output by the transceiver 2108.

In addition, to improve functions of the terminal device, the terminal device may further include one or more of an input unit 2114, a display unit 2116, an audio circuit 2118, a camera 2120, and a sensor 2122. The audio circuit may further include a speaker 21182, a microphone 21184, and the like.

The terminal device provided in this embodiment of this application obtains the time unit aggregation information and the DAI indication information that are sent by the base station, determines the feedback information based on the time unit aggregation information and the DAI indication information, and finally sends the feedback information to the base station. This can improve a manner of determining HARQ feedback information in an NR system, so as to support a scenario with a flexible quantity of aggregated/scheduled time units, thereby avoiding understanding inconsistency and disorder of the HARQ feedback information between the terminal device and the base station on a premise of ensuring downlink control overheads and uplink feedback overheads.

Optionally, when the processor 2104 determines the bit quantity of the feedback information for the at least one transport block based on the T-DAI indication information and the maximum quantity of time units that can be scheduled by one piece of DCI, the processor 2104 is specifically configured to:

determine that a product of the T-DAI indication information and the maximum quantity of time units that can be scheduled by one piece of DCI is the bit quantity of the feedback information for the at least one transport block.

The terminal device obtains the bit quantity of the feedback information based on the product of the T-DAI indication information and the maximum quantity of time units that is configured for a carrier and that can be scheduled by one piece of DCI, so that DCI overheads can be reduced and disorder of feedback information is avoided through multi-time-unit scheduling.

Optionally, when the processor 2104 orchestrates the feedback information for the transport block in the time unit scheduled by the DCI, to the location corresponding to the C-DAI indication information, the processor 2104 is specifically configured to:

when the maximum quantity of time units that can be scheduled by one piece of DCI is N, and a quantity of time units scheduled by one piece of DCI is X, where X is an integer greater than or equal to 1 and less than or equal to N, orchestrate the feedback information for the transport block in the time unit scheduled by the DCI, to first X bits at the location corresponding to the C-DAI indication information, and set (N−X) bits following the first X bits to default values.

The foregoing arrangement manner of the feedback information can ensure understanding consistency between the terminal device and the base station in the scenario of supporting a flexible quantity of aggregated time units, thereby avoiding disorder of the feedback information.

Optionally, the time unit aggregation information includes a quantity of time units scheduled by the DCI; and when the processor 2104 determines the feedback information for the at least one transport block based on the time unit aggregation information and the DAI indication information that are obtained by the transceiver 2108, the processor 2104 is specifically configured to:

determine the bit quantity of the feedback information for the at least one transport block based on the T-DAI indication information; and if a quantity of time units scheduled by one piece of DCI is Y, orchestrate, based on the C-DAI indication information, feedback information for transport blocks in the Y time units scheduled by the DCI, to Y bits at the location corresponding to the C-DAI indication information, where Y is an integer greater than or equal to 1.

The foregoing arrangement manner of the feedback information can further ensure understanding consistency between the transmit end and the receive end in the scenario of supporting a flexible quantity of aggregated time units, thereby avoiding disorder of the feedback information.

Optionally, the time unit aggregation information includes a carrier subset configured with time unit aggregation and/or a carrier subset configured without time unit aggregation; and when the processor 2104 determines the feedback information for the at least one transport block based on the time unit aggregation information and the DAI indication information that are obtained by the transceiver 2108, the processor 2104 is specifically configured to:

determine, based on a T-DAI corresponding to the carrier subset configured with time unit aggregation and a maximum quantity of time units configured for the carrier subset, a bit quantity of feedback information for the carrier subset configured with time unit aggregation;

orchestrate, based on C-DAI indication information in DCI in the carrier subset configured with time unit aggregation, feedback information for a transport block in a time unit scheduled by the DCI, to the feedback information for the carrier subset configured with time unit aggregation; and/or determine, based on a T-DAI corresponding to the carrier subset configured without time unit aggregation, a bit quantity of feedback information for the carrier subset configured without time unit aggregation; and orchestrate, based on C-DAI indication information in DCI in the carrier subset configured without time unit aggregation, feedback information for a transport block in a time unit scheduled by the DCI, to the feedback information for the carrier subset configured without time unit aggregation; and cascade the feedback information for the carrier subset configured with time unit aggregation and the feedback information for the carrier subset configured without time unit aggregation.

Whether a carrier is configured with time unit aggregation is considered during carrier grouping, and therefore feedback information may be separately determined based on a configuration status of time unit aggregation on each carrier, thereby saving unnecessary DCI indication overheads and UCI feedback overheads.

Optionally, the time unit aggregation information includes a quantity of aggregated time units configured for a carrier; and when the processor 2104 determines the feedback information for the at least one transport block based on the time unit aggregation information and the DAI indication information that are obtained by the transceiver 2108, the processor 2104 is specifically configured to:

group carriers into Z subsets based on the quantity of aggregated time units configured for a carrier, where configured quantities of aggregated time units on all carriers in one subset are the same; and for the $i^{th}$ subset of the Z subsets, determine a bit quantity of feedback information for the $i^{th}$ subset based on a T-DAI for the $i^{th}$ subset and a quantity of time units configured for the $i^{th}$ subset; orchestrate, based on C-DAI indication information in DCI in the $i^{th}$ subset, feedback information for a transport block in a time unit scheduled by the DCI, to feedback information for each subset, where i is greater than or equal to 1 and less than or equal to Z; and combine Z pieces of feedback information for the Z subsets, where Z is greater than or equal to 1.

Carriers are grouped into subsets based on information about a quantity of aggregated time units configured on each carrier, and feedback information is separately determined, thereby saving unnecessary DCI indication overheads and UCI feedback overheads.

Optionally, the time unit aggregation information includes whether a carrier is configured with or without time unit aggregation and/or includes a quantity of aggregated time units configured for a carrier; and when the processor 2104 determines the feedback information for the at least one transport block based on the time unit aggregation information and the DAI indication information that are obtained by the transceiver 2108, the processor 2104 is specifically configured to:

determine, based on the T-DAI indication information and the C-DAI indication information, feedback information for a carrier that is configured without time unit aggregation or whose configured quantity of aggregated time units is 1; and determine, based on a time window size, feedback information for a carrier that is configured with time unit aggregation and/or whose quantity of aggregated time units configured for a carrier is greater than 1.

The foregoing embodiment can ensure understanding consistency between the terminal device and the base station, support a flexible time unit aggregation configuration, and save unnecessary DCI overheads and UCI feedback overheads.

An embodiment of this application further provides a network device. For a location of the network device in a communications system, refer to the base station in FIG. 1. The network device may be a device configured to communicate with a terminal device. The network device may be a base station or may be a wireless controller in a cloud wireless access network scenario, or the network device may be a relay station, an access point, an in-vehicle device, a wearable device, a network device in a future 5G network, a network device in a future evolved PLMN network, or the like.

Figure 22:
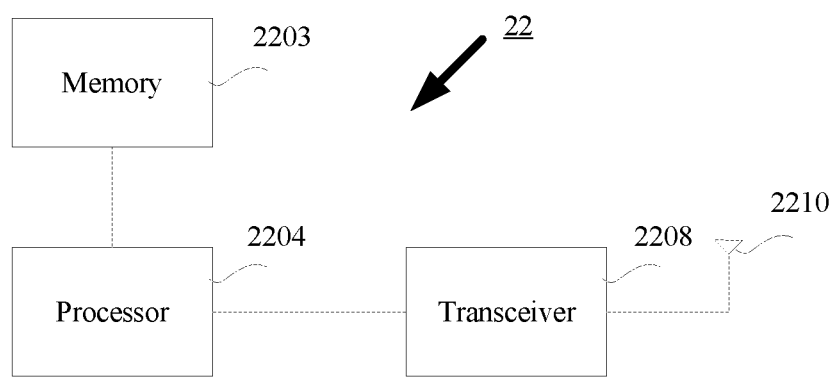
FIG. 22 is a schematic structural diagram of a network device according to this application.

FIG. 22 shows a network device 22 according to an embodiment of this application. The network device 22 includes at least a transceiver 2208 and a processor 2204.

The network device 22 may further include a memory 2203, and the memory 2203 stores a computer-executable instruction;

the processor 2204 is configured to control the transceiver 2208 to send control information to a receive end device, where the control information includes time unit aggregation information and/or downlink assignment index DAI indication information, and the DAI indication information includes at least one type of total downlink assignment index T-DAI indication information and counter downlink assignment index C-DAI indication information; and the processor 2204 is further configured to control the transceiver 2208 to receive feedback information sent by the receive end device for at least one transport block, where the feedback information is feedback information generated by the receive end device based on the control information.

The processor 2204 and the memory 2203 may be integrated into one processing apparatus. The processor 2204 is configured to execute program code stored in the memory 2203 to implement the foregoing functions.

The network device may further include an antenna 2210, configured to send, through a radio signal, downlink data or downlink control signaling that is output by the transceiver 2208.

It should be noted that each of the processor 2104 of the terminal device and the processor 2204 of the network device may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable logic gate array (FPGA), a generic array logic (GAL), or any combination thereof.

Each of the memory 2119 of the terminal device and the memory 2203 of the network device may include a volatile memory, for example, a random access memory (RAM); and may further include a non-volatile memory, for example, a flash memory, a hard disk drive (HDD), or a solid-state drive (SSD). The memory may further include a combination of the foregoing types of memories.

The solutions described in the embodiments of the terminal device in FIG. 21 and the network device in FIG. 22 can resolve the foregoing technical problem, thereby avoiding disorder and understanding inconsistency of HARQ feedback information between a receive end device and a transmit end device. This embodiment of this application further provides other implementations. For example, any one of implementations in Embodiment 2 to Embodiment 6 can be applied to the base station and the terminal device. For specific descriptions herein, refer to the descriptions in Embodiment 2 to Embodiment 6. Details are not described again.

This application further provides a communications system. As shown in FIG. 1, the communications system includes any terminal device as shown in FIG. 21 and described in detailed descriptions in the corresponding embodiment, and any network device as shown in FIG. 22 and described in detailed descriptions in the corresponding embodiment.

The network device in this apparatus embodiment of this application may be corresponding to the base stations in method Embodiment 1 to Embodiment 6 of this application, and the terminal device may be corresponding to the terminal devices in method Embodiment 1 to Embodiment 6 of this application. In addition, the foregoing and other operations and/or functions of the modules of the network device and the terminal device are respectively used to implement corresponding procedures in Embodiment 1 to Embodiment 6. For brevity, the descriptions of the method embodiments of this application are applicable to the apparatus embodiment. Details are not described herein again.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for convenience and brevity, for a detailed working process of the system, apparatus, and unit, reference may be made to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for processing feedback information, the method comprising:
   receiving, by a device in a wireless communication network, a set of hybrid automatic repeat request (HARQ) time sequence K1 values and time unit format information via one or more radio resource control (RRC) signalings, wherein a HARQ time sequence K1 value of the set of HARQ time sequence K1 values is a time relationship between a time unit of a physical downlink shared channel (PDSCH) and a time unit of a physical uplink control channel (PUCCH), or wherein a HARQ time sequence K1 value of the set of HARQ time sequence K1 values is a time relationship between a time unit of a PDSCH and a time unit of a physical uplink shared channel (PUSCH);
   determining, by the device, a quantity of HARQ feedback information bits based on the set of HARQ time sequence K1 values and the time unit format information; and
   sending, by the device, the HARQ feedback information bits.

2. The method according to claim 1, wherein the time unit format information comprises one or more of: a quantity of time units for uplink transmission in one configuration period or a quantity of time units for downlink transmission in one configuration period.

3. The method according to claim 2, wherein the determining, by the device, the quantity of the HARQ feedback information bits comprises:
   determining the quantity of the HARQ feedback information bits based on a size of the set of HARQ time sequence K1 values and the quantity of time units for uplink transmission in a time window.

4. The method according to claim 3, wherein the determining the quantity of the HARQ feedback information bits comprises:
   determining a time unit set based on the size of the set of HARQ time sequence K1 values;
   in response to determining that the time unit set comprises a time unit for uplink transmission, removing the time unit for uplink transmission from the time unit set; and
   determining the quantity of the HARQ feedback information bits based on a time unit set obtained after removing the time unit for uplink transmission.

5. The method according to claim 3, further comprising:
   obtaining a first uplink time unit for the HARQ feedback information bits;
   obtaining a second uplink time unit indicated by a HARQ time sequence K1 value in downlink control information (DCI) corresponding to a PDSCH in the time window corresponding to the first uplink time unit; and
   in response to determining that the first uplink time unit is not the second uplink time unit, setting a corresponding bit in the HARQ feedback information bits in the first uplink time unit to negative acknowledgement (NACK).

6. A communication device, comprising:
   a transceiver, configured to receive a set of hybrid automatic repeat request (HARQ) time sequence K1 values and time unit format information via one or more radio resource control (RRC) signalings, wherein a HARQ time sequence K1 value of the set of HARQ time sequence K1 values is a time relationship between a time unit for of a physical downlink shared channel (PDSCH) and a time unit of a physical uplink control channel (PUCCH), or wherein a HARQ time sequence K1 value of the set of HARQ time sequence K1 values is a time relationship between a time unit of a PDSCH and a time unit of a physical uplink shared channel PUSCH; and
   a processor, configured to determine a quantity of HARQ feedback information bits based on the set of HARQ time sequence K1 values and the time unit format information,
   wherein the transceiver is further configured to send the HARQ feedback information bits.

7. The receive end device according to claim 6, wherein the time unit format information comprises one or more of: a quantity of time units for uplink transmission in one configuration period or a quantity of time units for downlink transmission in one configuration period.

8. The receive end device according to claim 7, wherein the processor is configured to determine the quantity of the HARQ feedback information bits based on a size of the set of HARQ time sequence K1 values and the quantity of time units for uplink transmission in a time window.

9. The receive end device according to claim 8, determining the quantity of the HARQ feedback information bits comprises:
   determining a time unit set based on the size of the set of HARQ time sequence K1 values;
   in response to determining that the time unit set comprises a time unit for uplink transmission, removing the time unit for uplink transmission from the time unit set; and
   determining the quantity of the HARQ feedback information bits based on a time unit set obtained after removing the time unit for uplink transmission.

10. The receive end device according to claim 8, wherein the processor is further configured to:
    obtain a first uplink time unit for the HARQ feedback information bits;
    obtain a second uplink time unit indicated by a HARQ time sequence K1 value in downlink control information (DCI) corresponding to a PDSCH in the time window corresponding to the first uplink time unit; and
    in response to determining that the first uplink time unit is not the second uplink time unit, set a corresponding bit in the HARQ feedback information bits in the first uplink time unit to negative acknowledgement (NACK).

11. A non-transitory computer-readable storage medium storing instructions that, when executed by a device, cause the device to perform operations comprising:
    obtaining a set of hybrid automatic repeat request (HARQ) time sequence K1 values and time unit format information via one or more radio resource control (RRC) signalings, wherein a HARQ time sequence K1 value of the set of HARQ time sequence K1 values is a time relationship between a time unit of a physical downlink shared channel (PDSCH) and a time unit of a physical uplink control channel (PUCCH), or wherein a HARQ time sequence K1 value of the set of HARQ time sequence K1 values is a time relationship between a time unit of a PDSCH and a time unit of a physical uplink shared channel (PUSCH);
    determining a quantity of HARQ feedback information bits based on the set of HARQ time sequence K1 values and the time unit format information; and
    outputting the HARQ feedback information bits.

12. The non-transitory computer readable medium according to claim 11, wherein the time unit format information comprises one or more of: a quantity of time units for uplink transmission in one configuration period or a quantity of time units for downlink transmission in one configuration period.

13. The non-transitory computer readable medium according to claim 11, wherein the operations further comprise:
    determining the quantity of the HARQ feedback information bits based on a size of the set of HARQ time sequence K1 values and the quantity of time units for uplink transmission in a time window.

14. The non-transitory computer readable medium according to claim 11, wherein the operations further comprise:
    determining a time unit set based on the size of the set of HARQ time sequence K1 values;
    in response to determining that the time unit set comprises a time unit for uplink transmission, removing the time unit for uplink transmission from the time unit set; and
    determining the quantity of the HARQ feedback information bits based on a time unit set obtained after removing the time unit for uplink transmission.

15. The non-transitory computer readable medium according to claim 11, wherein the operations further comprise:
    obtaining a first uplink time unit for the HARQ feedback information bits;
    obtaining a second uplink time unit indicated by a HARQ time sequence K1 value in downlink control information (DCI) corresponding to a PDSCH in the time window corresponding to the first uplink time unit; and
    in response to determining that the first uplink time unit is not the second uplink time unit, setting a corresponding bit in the HARQ feedback information bits in the first uplink time unit to negative acknowledgement (NACK).

16. A device in a wireless communication network, the device comprising:
a processor; and
a memory storing program instructions that, when executed by the processor, cause the device to:
obtain a set of hybrid automatic repeat request (HARQ) time sequence K1 values and time unit format information via one or more radio resource control (RRC) signalings, wherein a HARQ time sequence K1 value of the set of HARQ time sequence K1 values is a time relationship between a time unit for of a physical downlink shared channel (PDSCH) and a time unit of a physical uplink control channel (PUCCH), or wherein a HARQ time sequence K1 value of the set of HARQ time sequence K1 values is a time relationship between a time unit of a PDSCH and a time unit of a physical uplink shared channel (PUSCH); and
determine a quantity of HARQ feedback information bits based on the set of HARQ time sequence K1 values and the time unit format information, and
output the HARQ feedback information bits.

17. The device according to claim 16, wherein the time unit format information comprises one or more of: a quantity of time units for uplink transmission in one configuration period or a quantity of time units for downlink transmission in one configuration period.

18. The device according to claim 17, wherein the processor is further configured to:
determine the quantity of the HARQ feedback information bits based on a size of the set of HARQ time sequence K1 values and the quantity of time units for uplink transmission in a time window.

19. The device according to claim 18, wherein the processor is configured to:
determine a time unit set based on the size of the set of HARQ time sequence K1 values;
in response to determining that the time unit set comprises a time unit for uplink transmission, removing the time unit for uplink transmission from the time unit set; and
determine the quantity of the HARQ feedback information bits based on a time unit set obtained after removing the time unit for uplink transmission.

20. The device according to claim 18, wherein the processor is further configured to:
obtain a first uplink time unit for the HARQ feedback information bits;
obtain a second uplink time unit indicated by a HARQ time sequence K1 value in downlink control information (DCI) corresponding to a PDSCH in the time window corresponding to the first uplink time unit; and
in response to determining that the first uplink time unit is not the second uplink time unit, set a corresponding bit in the HARQ feedback information bits in the first uplink time unit to negative acknowledgement (NACK).

* * * * *